United States Patent
Tajik

(10) Patent No.: US 12,317,062 B2
(45) Date of Patent: *May 27, 2025

(54) DUAL LISTENER POSITIONS FOR MIXED REALITY

(71) Applicant: Magic Leap, Inc., Plantation, FL (US)

(72) Inventor: Anastasia Andreyevna Tajik, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,728

(22) Filed: Feb. 26, 2024

(65) Prior Publication Data

US 2024/0205630 A1     Jun. 20, 2024

Related U.S. Application Data

(63) Continuation of application No. 18/340,744, filed on Jun. 23, 2023, now Pat. No. 11,956,620, which is a
(Continued)

(51) Int. Cl.
*H04S 7/00* (2006.01)
*G02B 27/01* (2006.01)
(Continued)

(52) U.S. Cl.
CPC .......... *H04S 7/303* (2013.01); *G02B 27/0101* (2013.01); *G02B 27/0172* (2013.01);
(Continued)

(58) Field of Classification Search
None
See application file for complete search history.

(56) References Cited

U.S. PATENT DOCUMENTS

| 4,852,988 A | 8/1989 | Velez |
| 5,596,644 A | 1/1997 | Abel et al. |
| | (Continued) | |

FOREIGN PATENT DOCUMENTS

| CA | 2316473 A1 | 1/2001 |
| CA | 2362895 A1 | 12/2002 |
| | (Continued) | |

OTHER PUBLICATIONS

Israeli Notice of Allowance dated Jun. 16, 2024, for IL Application No. 307545, three pages.
(Continued)

*Primary Examiner* — Duc Nguyen
*Assistant Examiner* — Assad Mohammed
(74) *Attorney, Agent, or Firm* — Morrison & Foerster LLP

(57) ABSTRACT

A method of presenting audio comprises: identifying a first ear listener position and a second ear listener position in a mixed reality environment; identifying a first virtual sound source in the mixed reality environment; identifying a first object in the mixed reality environment; determining a first audio signal in the mixed reality environment, wherein the first audio signal originates at the first virtual sound source and intersects the first ear listener position; determining a second audio signal in the mixed reality environment, wherein the second audio signal originates at the first virtual sound source, intersects the first object, and intersects the second ear listener position; determining a third audio signal based on the second audio signal and the first object; presenting, to a first ear of a user, the first audio signal; and presenting, to a second ear of the user, the third audio signal.

20 Claims, 12 Drawing Sheets

Related U.S. Application Data continuation of application No. 18/047,168, filed on Oct. 17, 2022, now Pat. No. 11,736,888, which is a continuation of application No. 17/528,473, filed on Nov. 17, 2021, now Pat. No. 11,589,182, which is a continuation of application No. 16/970,324, filed as application No. PCT/US2019/018369 on Feb. 15, 2019, now Pat. No. 11,212,636.

(60) Provisional application No. 62/631,422, filed on Feb. 15, 2018.

(51) Int. Cl.
*G06T 19/00* (2011.01)
*H04R 1/40* (2006.01)
*H04R 3/12* (2006.01)

(52) U.S. Cl.
CPC .......... *G06T 19/006* (2013.01); *H04R 1/403* (2013.01); *H04R 3/12* (2013.01); *G02B 2027/0138* (2013.01); *H04R 2430/20* (2013.01); *H04R 2499/15* (2013.01); *H04S 2400/11* (2013.01); *H04S 2420/01* (2013.01)

(56) References Cited

U.S. PATENT DOCUMENTS

| | | |
|---|---|---|
| 6,433,760 B1 | 8/2002 | Vaissie |
| 6,491,391 B1 | 12/2002 | Blum et al. |
| 6,546,105 B1 | 4/2003 | Katayama et al. |
| 6,819,762 B2 | 11/2004 | Jones et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,347,551 B2 | 3/2008 | Fergason et al. |
| 7,488,294 B2 | 2/2009 | Torch |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,767,968 B2 * | 7/2014 | Flaks .................. H04S 7/306 381/310 |
| 8,929,589 B2 | 1/2015 | Publicover et al. |
| 9,010,929 B2 | 4/2015 | Lewis |
| 9,274,338 B2 | 3/2016 | Robbins et al. |
| 9,292,973 B2 | 3/2016 | Bar-zeev et al. |
| 9,323,325 B2 | 4/2016 | Perez et al. |
| 9,720,505 B2 | 8/2017 | Gribetz et al. |
| 9,955,281 B1 | 4/2018 | Lyren et al. |
| 9,992,602 B1 | 6/2018 | Allen |
| 10,013,053 B2 | 7/2018 | Cederlund et al. |
| 10,025,379 B2 | 7/2018 | Drake et al. |
| 11,122,383 B2 | 9/2021 | Audfray et al. |
| 11,212,636 B2 | 12/2021 | Tajik |
| 11,546,716 B2 | 1/2023 | Audfray et al. |
| 11,589,182 B2 | 2/2023 | Tajik |
| 11,736,888 B2 | 8/2023 | Tajik |
| 11,778,411 B2 | 10/2023 | Audfray et al. |
| 11,956,620 B2 | 4/2024 | Tajik |
| 12,063,497 B2 | 8/2024 | Audfray |
| 2003/0030597 A1 | 2/2003 | Geist |
| 2006/0023158 A1 | 2/2006 | Howell et al. |
| 2009/0180624 A1* | 7/2009 | Nakayama .............. A63F 13/10 381/61 |
| 2010/0080396 A1 | 4/2010 | Aoyagi |
| 2011/0211056 A1 | 9/2011 | Publicover et al. |
| 2011/0213664 A1 | 9/2011 | Osterhout |
| 2012/0021806 A1 | 1/2012 | Maltz |
| 2012/0093320 A1* | 4/2012 | Flaks .................. H04S 7/304 381/17 |
| 2012/0206452 A1 | 8/2012 | Geisner et al. |
| 2013/0077147 A1 | 3/2013 | Efimov |
| 2013/0120224 A1 | 5/2013 | Cajigas |
| 2013/0236040 A1 | 9/2013 | Crawford |
| 2014/0195918 A1 | 7/2014 | Friedlander |
| 2014/0320389 A1 | 10/2014 | Scavezze |
| 2015/0168731 A1 | 6/2015 | Robbins |
| 2015/0373474 A1 | 12/2015 | Kraft et al. |
| 2016/0025982 A1* | 1/2016 | Sutherland .......... G06F 3/04815 359/13 |
| 2016/0134987 A1 | 5/2016 | Gorzel et al. |
| 2016/0163110 A1 | 6/2016 | Chang et al. |
| 2017/0153866 A1* | 6/2017 | Grinberg ................. H04S 7/302 |
| 2017/0223478 A1 | 8/2017 | Jot |
| 2018/0101990 A1 | 4/2018 | Yang et al. |
| 2018/0109901 A1* | 4/2018 | Laaksonen ........... A63F 13/577 |
| 2018/0321894 A1 | 11/2018 | Paulovich et al. |
| 2018/0341455 A1* | 11/2018 | Ivanov .................... G06F 40/58 |
| 2019/0102956 A1 | 4/2019 | Ishihara |
| 2019/0293609 A1* | 9/2019 | Oh .......................... G01S 15/89 |
| 2019/0313201 A1 | 10/2019 | Torres et al. |
| 2023/0396947 A1 | 12/2023 | Audfray et al. |
| 2024/0357311 A1 | 10/2024 | Audfray |

FOREIGN PATENT DOCUMENTS

| | | |
|---|---|---|
| CA | 2388766 A1 | 12/2003 |
| GB | 2536020 A | 9/2016 |
| WO | 2015072091 A1 | 5/2015 |
| WO | 2015192117 A1 | 12/2015 |
| WO | 2017183346 A1 | 10/2017 |
| WO | 2018132235 A1 | 7/2018 |

OTHER PUBLICATIONS

Japanese Office Action mailed May 29, 2024, for JP Application No. 2023-047790, with English translation, 8 pages.
Notice of Allowance mailed May 30, 2024, for U.S. Appl. No. 18/451,794, filed Aug. 17, 2023, five pages.
Chinese Notice of Allowance dated Jan. 16, 2023, for CN Application No. 201980080065.2, with English translation, 6 pages.
Chinese Notice of Allowance dated Jan. 26, 2022, for CN Application No. 201980012942.2, with English translation, six pages.
Chinese Notice of Allowance dated Jan. 4, 2024, for CN Application No. 202210301214.7, with English translation, six pages.
Chinese Office Action dated Jul. 16, 2021, for CN Application No. 201980012942.2, with English translation, 16 pages.
Chinese Office Action dated Jul. 20, 2022, for CN Application No. 201980080065.2, with English translation 15 pages.
Chinese Office Action dated Sep. 1, 2023, for CN Application No. 202210301214.7, with English translation, 7 pages.
European Office Action dated Oct. 10, 2023, for EP Application No. 19869249.3, six pages.
European Search Report mailed Nov. 30, 2021, for EP Application No. 19869249.3, six pages.
Final Office Action mailed Nov. 12, 2020, for U.S. Appl. No. 16/593,943, filed Oct. 4, 2019, 17 pages.
International Preliminary Report on Patentability and Written Opinion dated Apr. 15, 2021, for PCT Application No. PCT/US2019/054893, filed Oct. 4, 2019, eleven pages.
International Preliminary Report on Patentability dated Aug. 18, 2020, for PCT Application No. PCT/US2019/018369, filed Feb. 15, 2019, five pages.
International Search Report and Written Opinion, mailed May 7, 2019, for PCT Application No. PCT/US2019/18369, filed Feb. 15, 2019, eleven pages.
International Search Report dated Jan. 10, 2020, for PCT Application No. PCT/US2019/054893, filed Oct. 4, 2019, one page.
Israeli Notice of Allowance dated Dec. 22, 2022, for IL Application No. 276496, three pages.
Israeli Notice of Allowance dated Jul. 12, 2023, for IL Application No. 301445, four pages.
Jacob, R. "Eye Tracking in Advanced Interface Design", Virtual Environments and Advanced Interface Design, Oxford University Press, Inc. (Jun. 1995).
Japanese Notice of Allowance mailed Dec. 28, 2023, for JP Application No. 2022-196982, with English translation, six pages.

(56) References Cited

OTHER PUBLICATIONS

Japanese Notice of Allowance mailed Feb. 16, 2024, for JP Application No. 2022-160027, with English translation, six pages.
Japanese Notice of Allowance mailed Feb. 28, 2023, for JP Application No. 2020-543356, with English translation, 6 pages.
Japanese Notice of Allowance mailed Nov. 10, 2022, for JP Application No. 2021-518639, with English translation, six pages.
Japanese Office Action mailed Oct. 20, 2023, for JP Application No. 2022-160027, with English translation, 4 pages.
Non-Final Office Action mailed Apr. 13, 2023, for U.S. Appl. No. 18/061,367, filed Dec. 2, 2022, nine pages.
Non-Final Office Action mailed Jul. 7, 2020, for U.S. Appl. No. 16/593,943, filed Oct. 4, 2019, 13 pages.
Non-Final Office Action mailed Mar. 28, 2024, for U.S. Appl. No. 18/451,794, filed Aug. 17, 2023, five pages.
Notice of Allowability (corrected) mailed Jun. 18, 2021, for U.S. Appl. No. 16/593,943, filed Oct. 4, 2019, 6 pages.
Notice of Allowance (corrected) mailed Feb. 14, 2024, for U.S. Appl. No. 18/340,744, filed Jun. 23, 2023, twelve pages.
Notice of Allowance mailed Aug. 18, 2021, for U.S. Appl. No. 16/970,324, filed Aug. 14, 2020, 11 pages.
Notice of Allowance mailed Jan. 26, 2024, for U.S. Appl. No. 18/340,744, filed Jun. 23, 2023, fifteen pages.
Notice of Allowance mailed Jul. 20, 2023, for U.S. Appl. No. 18/061,367, filed Dec. 2, 2022, five pages.
Notice of Allowance mailed Mar. 29, 2021, for U.S. Appl. No. 16/593,943, filed Oct. 4, 2019, eight pages.
Notice of Allowance mailed May 24, 2023, for U.S. Appl. No. 18/047,168, filed Oct. 17, 2022, eighteen pages.
Notice of Allowance mailed Sep. 16, 2022, for U.S. Appl. No. 17/528,473, filed Nov. 17, 2021, 13 pages.
Notice of Allowance mailed Sep. 7, 2022, for U.S. Appl. No. 17/401,090, filed Aug. 12, 2021, five pages.
Olson, H. F. (Mar. 1973). "Gradient loudspeakers," RCA Laboratories, Princeton, N. J., Journal of the Audio Engineering Society, vol. 21, 86-93.
Rolland, J. et al., "High-resolution inset head- mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Wenzel, E. M., et al.: "Sound Lab: A real-time, software-based system for the study of spatial hearing", Internet Citation, Feb. 19, 2000 (Feb. 19, 2000), Retrieved from the Internet: URL:http://pddocserv/specdocs/data/handboo ks/AES/Conv-Preprints/2000/PP0002/5140.pdf [retrieved on Mar. 26, 2007] *Sections 2.1, 2.2*.
Yoshida, A. et al., "Design and Applications of a High Resolution Insert Head Mounted Display", (Jun. 1994).
Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf , retrieved on Oct. 26, 2020.
Carmigniani, J., et al., "Augmented Reality Technologies, Systems and Applications," Multimedia Tools and Applications, 51(1):341-77 (Dec. 2010) ("Augmented Reality Technologies").
Declaration of Dr. Stephen C. Thompson Under 37 C.F.R. § 1.132 including Appendix A (List of Materials Considered) and Appendix B (Curriculum Vitae) and Incorporated Claim Charts CC-1-CC-9.
Feiner, S., "The Importance of Being Mobile: Some Social Consequences of Wearable Augmented Reality Systems," Proceedings 2nd IEEE and ACM International Workshop on Augmented Reality (IWAR'99) (Oct. 1999).
Israeli Notice of Allowance dated Jul. 9, 2024, for IL Application No. 307545, four pages.
Japanese Notice of Allowance mailed Nov. 22, 2024, for JP Application No., 2023-047790, with English translation, 6 pages.
Milgram, P. and Kishino, F., "A Taxonomy of Mixed Reality Visual Displays," IEICE Transactions on Information & Systems, E77-D(12):1321-29 (Dec. 1994) ("Taxonomy of Mixed Reality").
Prosecution History of U.S. Pat. No. 11,212,636.
Japanese Notice of Allowance mailed Apr. 9, 2025, for JP Application No., 2024-135322, with English translation, 6 pages.

* cited by examiner

DUAL LISTENER POSITIONS FOR MIXED REALITY

CROSS-REFERENCE TO RELATED APPLICATIONS

This application is a continuation of U.S. patent application Ser. No. 18/340,744, filed Jun. 23, 2023, which a continuation of U.S. patent application Ser. No. 18/047,168, filed Oct. 17, 2022 (now U.S. Pat. No. 11,736,888) which is a continuation of U.S. patent application Ser. No. 17/528,473, filed Nov. 17, 2021 (now U.S. Pat. No. 11,589,182, issued Feb. 21, 2023) which is a continuation of U.S. patent application Ser. No. 16/970,324, filed Feb. 15, 2019 (now U.S. Pat. No. 11,212,636, issued Dec. 28, 2021), which is a national stage application under 35 U.S.C. § 371 of International Application No. PCT/US2019/18369, filed internationally on Feb. 15, 2019, which claims benefit of U.S. Provisional Patent Application No. 62/631,422, filed Feb. 15, 2018, which are hereby incorporated by reference in their entirety.

FIELD

This disclosure relates in general to systems and methods for presenting audio signals, and in particular to systems and methods for presenting stereo audio signals to a user of a mixed reality system.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modem computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

xR systems may provide the user with various ways in which to interact with a virtual environment; for example, XR systems may include various sensors (e.g., cameras, microphones, etc.) for detecting a user's position and orientation, facial expressions, speech, and other characteristics; and present this information as input to the virtual environment. Some XR systems may incorporate a sensor-equipped input device, such as a virtual "mallet," and may be configured to detect a position, orientation, or other characteristic of the input device.

xR systems can offer a uniquely heightened sense of immersion and realism by combining virtual visual and audio cues with real sights and sounds. For example, it may be desirable to present audio cues to a user of an XR system in a way that mimics aspects, particularly subtle aspects, of our own sensory experiences. The present invention is directed to presenting, to a user, stereo audio signals originating from a single sound source in a mixed reality environment, such that the user is able to identify a position and orientation of the sound source in the mixed reality environment based on the differences in the signals received by the user's left ear and right ear. By using audio cues to identify the position and orientation of the sound source in the mixed reality environment, the user may experience a heightened awareness of virtual sounds originating from that position and orientation. Additionally, the user's sense of immersion in a mixed reality environment can be enhanced by presenting stereo audio that not only corresponds to direct audio signals, but that presents a fully immersive soundscape generated using to a 3D propagation model.

BRIEF SUMMARY

Examples of the disclosure describe systems and methods for presenting audio signals in a mixed reality environment. In one example, a method comprises the steps of identifying a first ear listener position in the mixed reality environment; identifying a second ear listener position in the mixed reality environment; identifying a first virtual sound source in the mixed reality environment; identifying a first object in the mixed reality environment; determining a first audio signal in the mixed reality environment wherein the first audio signal originates at the first virtual sound source and intersects the first ear listener position; determining a second audio signal in the mixed reality environment, wherein the second audio signal originates at the first virtual sound source, intersects the first object, and intersects the second ear listener position; determining a third audio signal based on the second audio signal and the first object; presenting, via a first speaker to a first ear of a user, the first audio signal; and presenting, via a second speaker to a second ear of the user, the third audio signal.

DETAILED DESCRIPTION

Figure 1A:
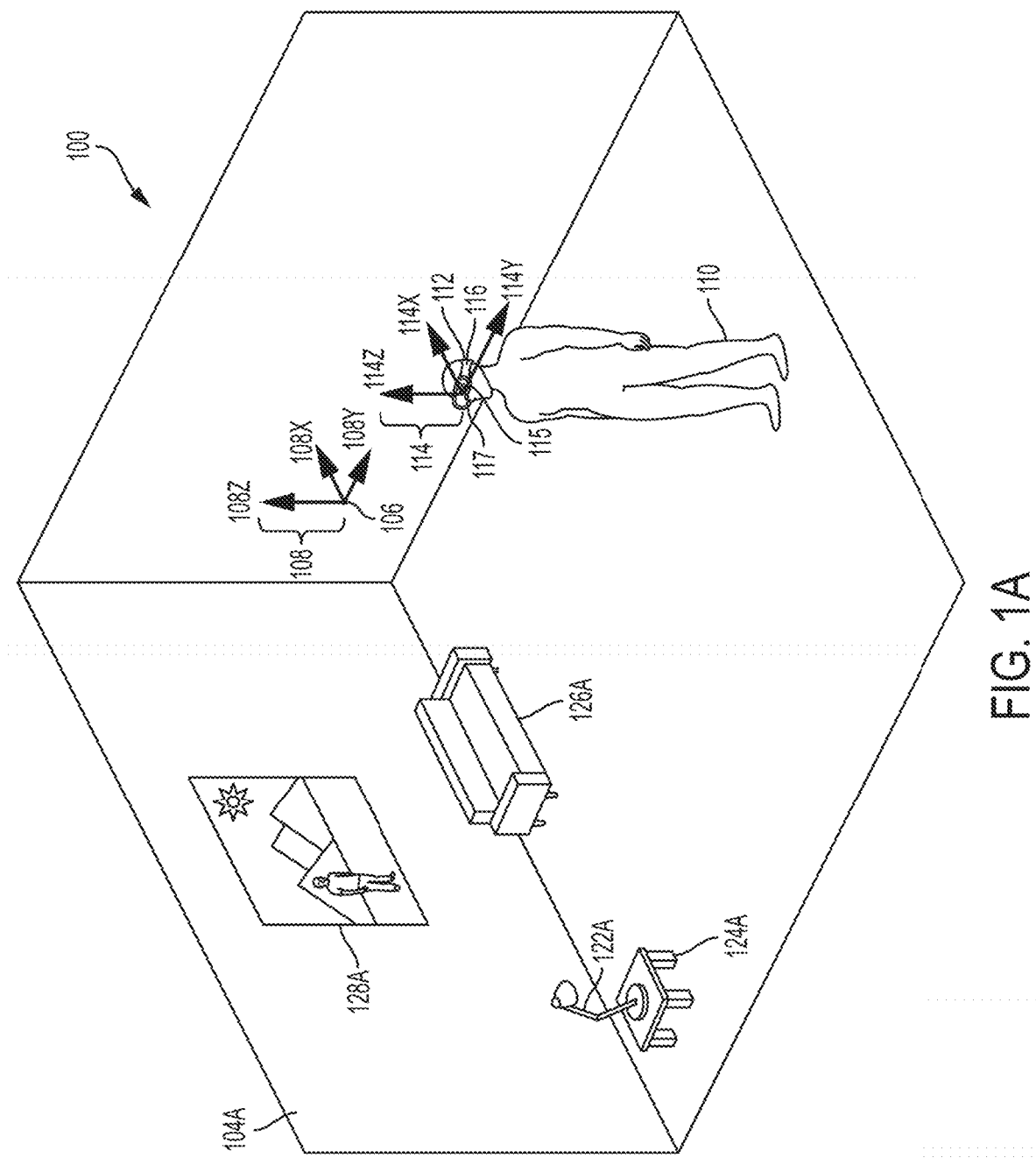
FIGS. 1A-1C illustrate an example mixed reality environment.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time tO, based on data associated with the virtual environment and/or input provided by a user, a state of the virtual environment at a second time tl. For instance, if an object in the virtual environment is located at a first coordinate at time tO, and has certain programmed physical parameters (e.g., mass, coefficient of friction); and an input received from user indicates that a force should be applied to the object in a direction vector; the processor can apply laws of kinematics to determine a location of the object at time tl using basic mechanics. The processor can use any suitable information known about the virtual environment, and/or any suitable input, to determine a state of the virtual environment at a time tl. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment. 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a wearable head device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
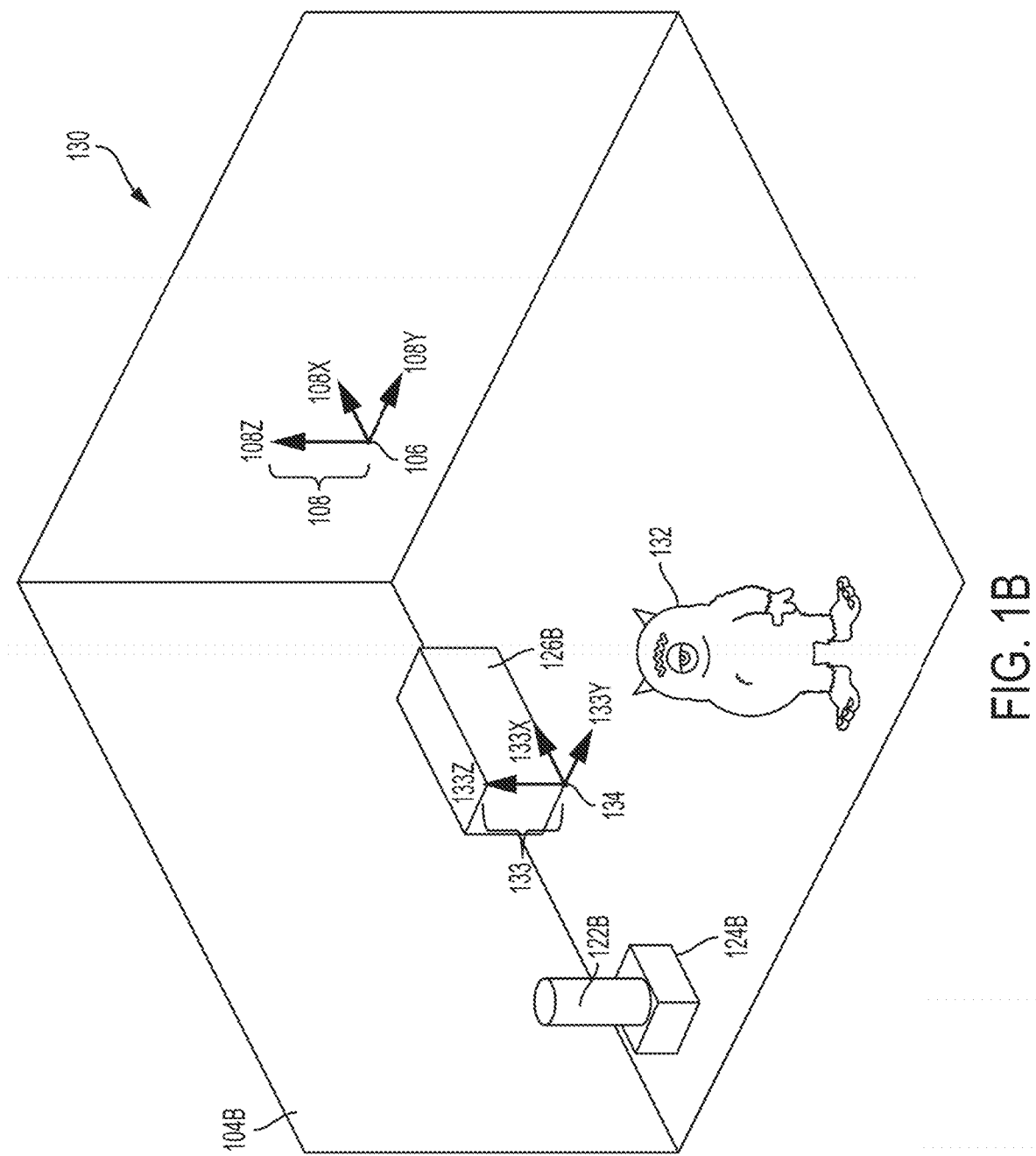

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
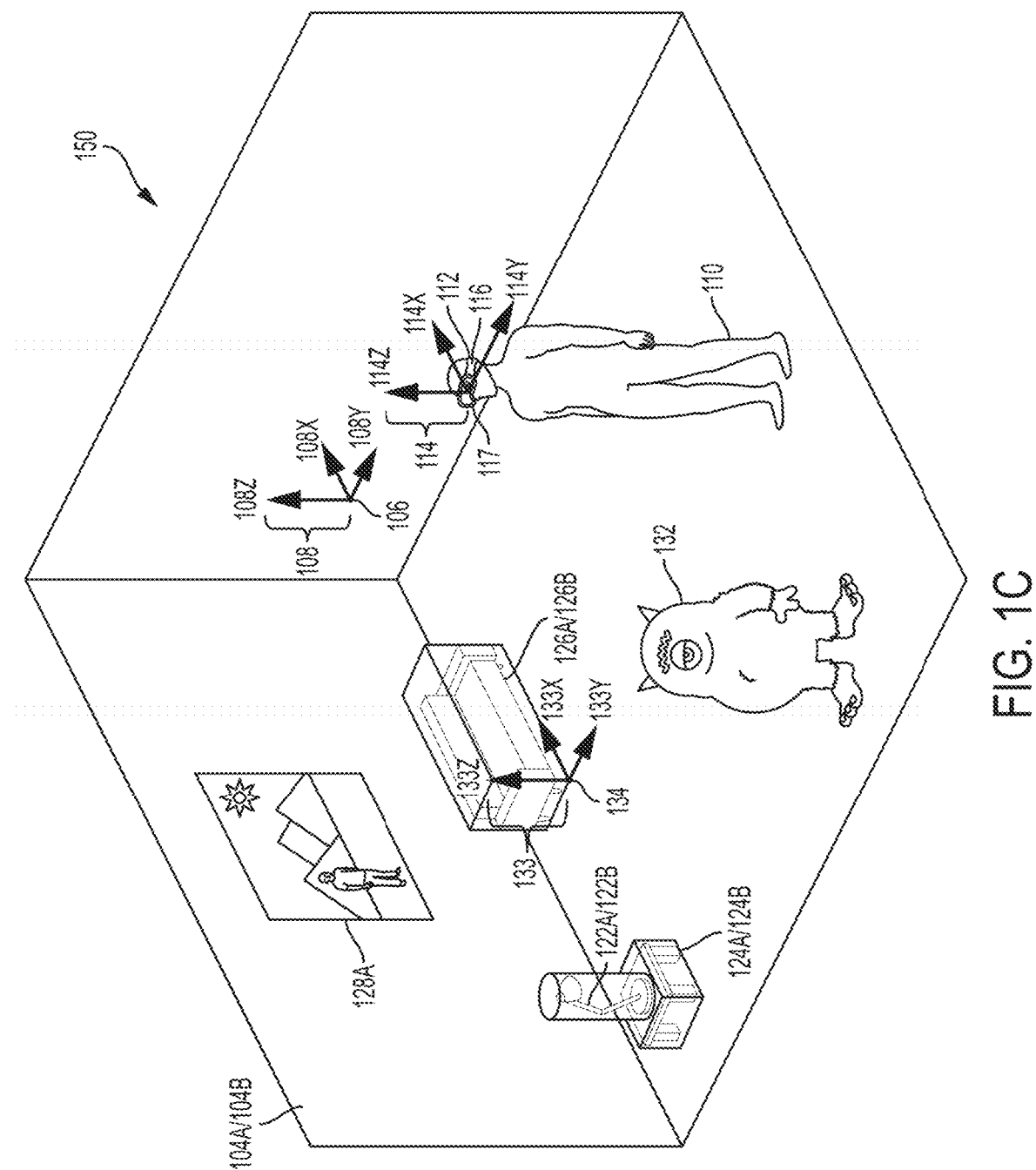

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects.

This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
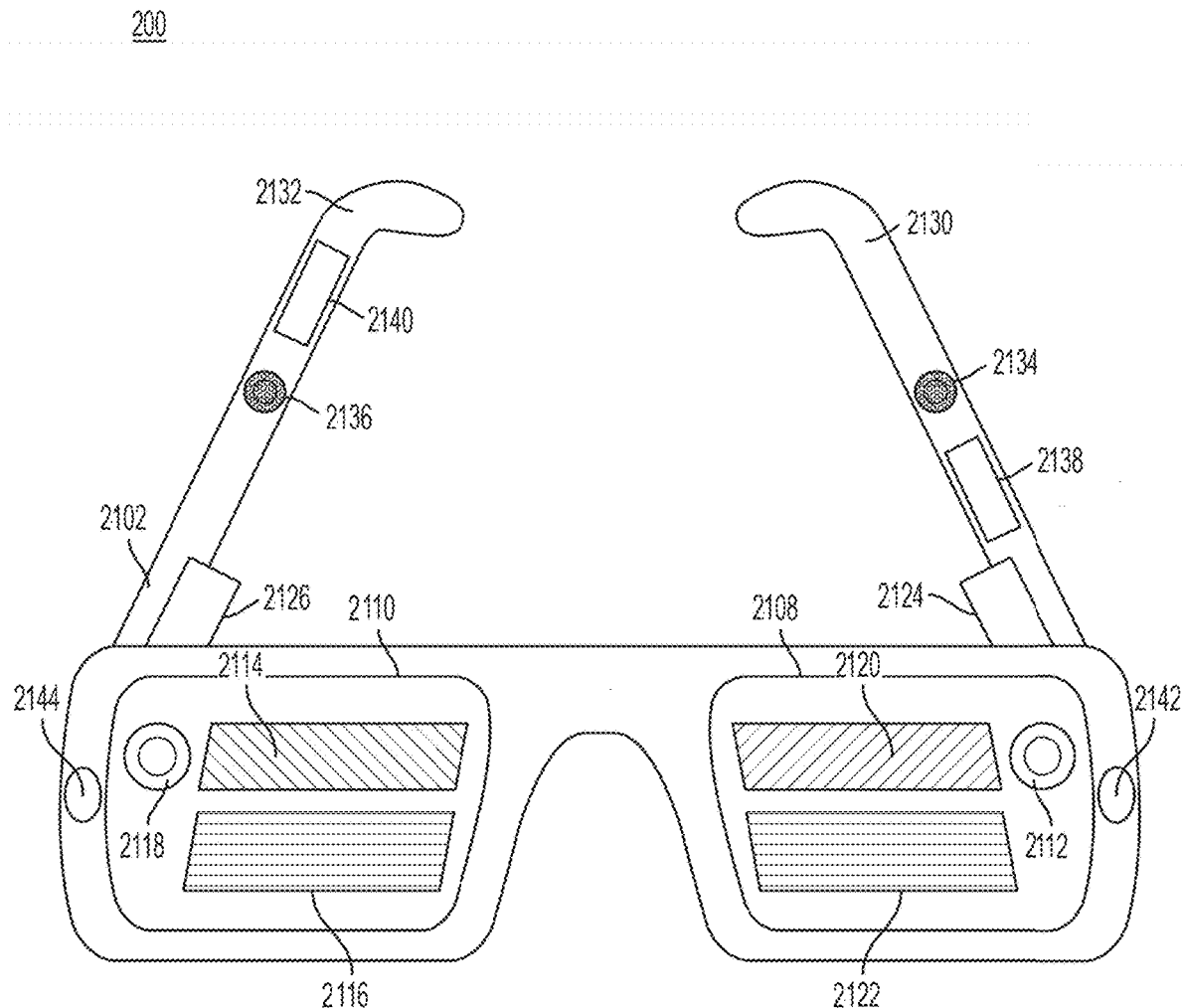
FIGS. 2A-2D illustrate components of an example mixed reality system that can be used to interact with a mixed reality environment.
Figure 2B:
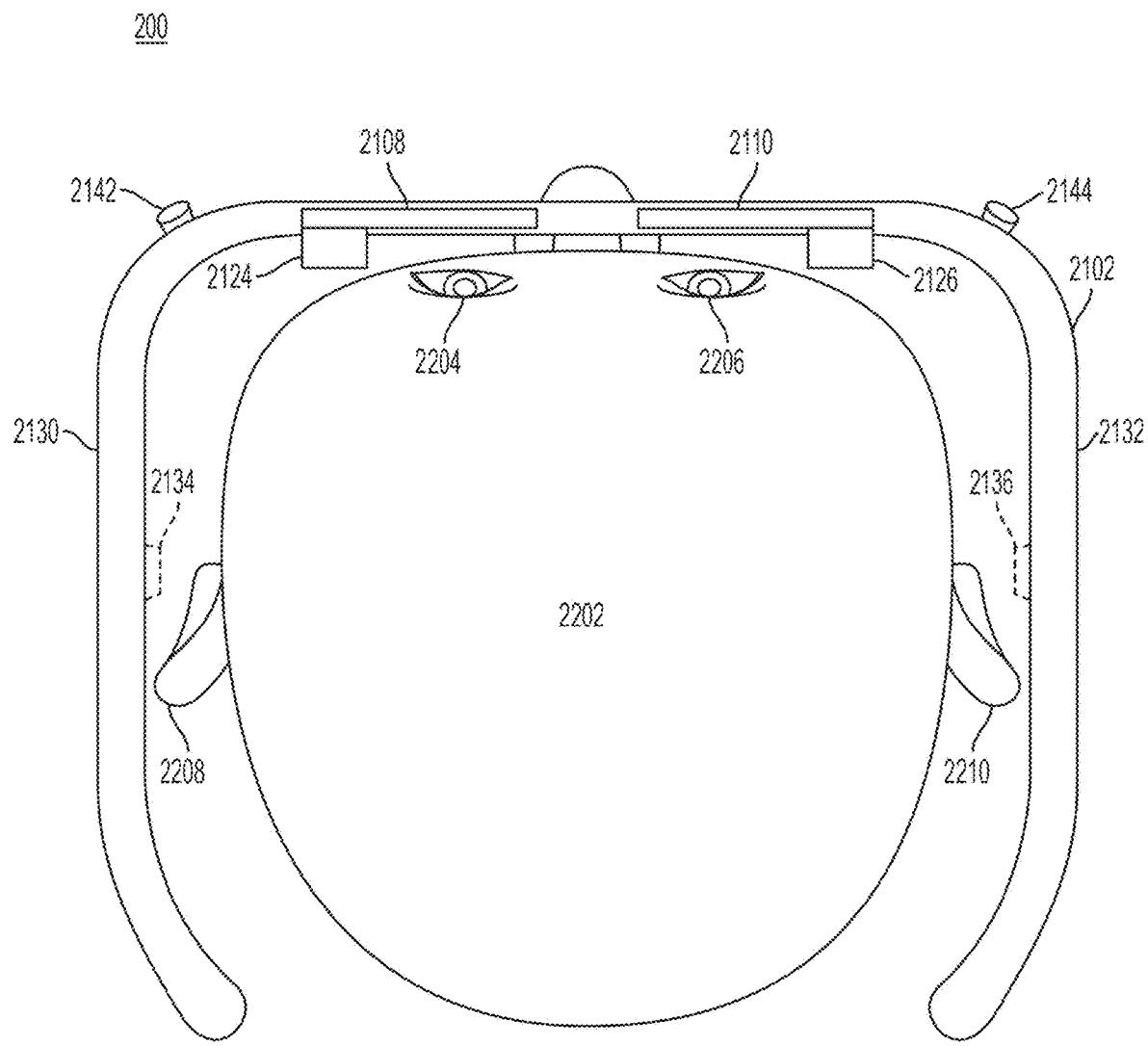
Figure 2C:
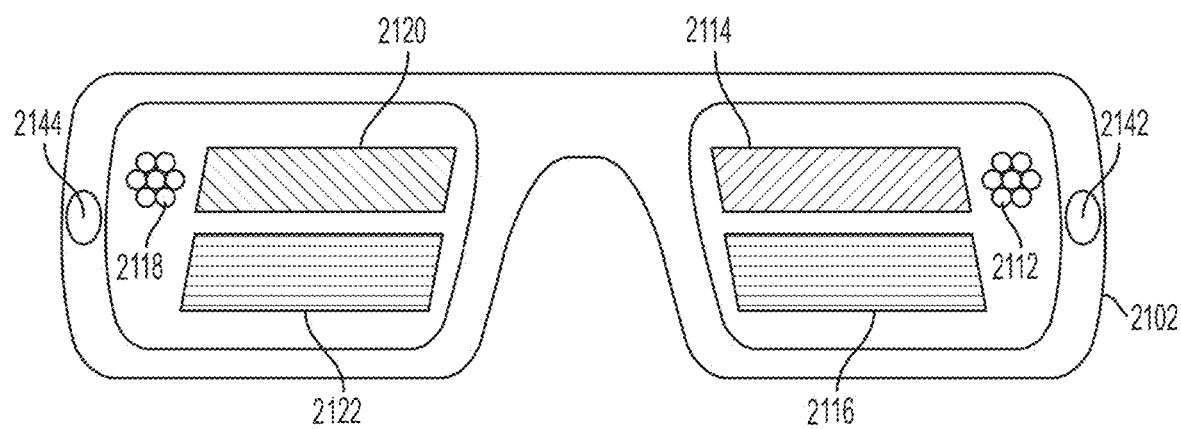
Figure 2D:
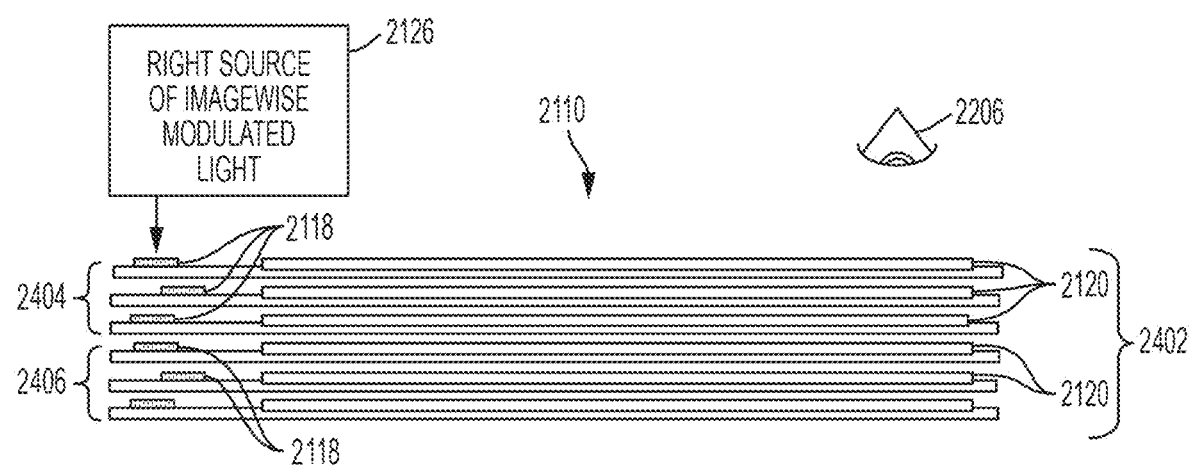

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple aim 2130 and a right temple arm 2132, where the left temple arm 2130 includes a left speaker 2134 and the right temple arm 12132 includes a right speaker 2136. An orthogonal coil electromagnetic receiver 2138 can be located in the left temple piece, or in another suitable location in the wearable head device 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (pLED) or micro Organic Light Emitting Diode (pOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
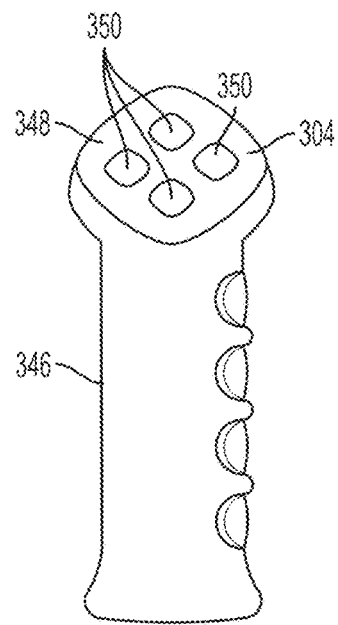
FIG. 3A illustrates an example mixed reality handheld controller that can be used to provide input to a mixed reality environment.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
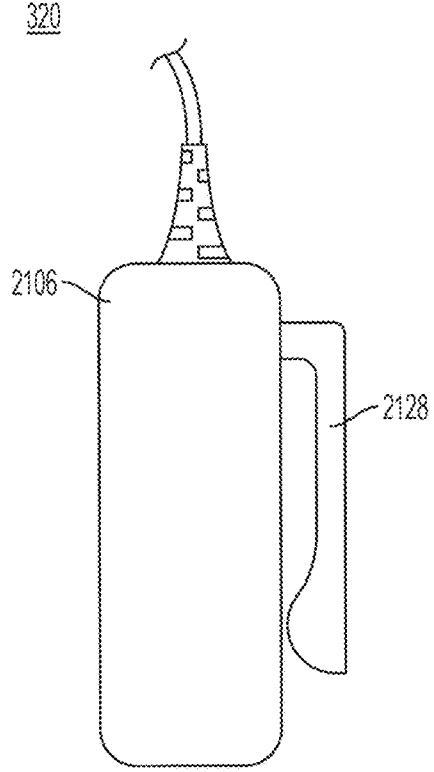
FIG. 3B illustrates an example auxiliary unit that can be included in an example mixed reality system.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
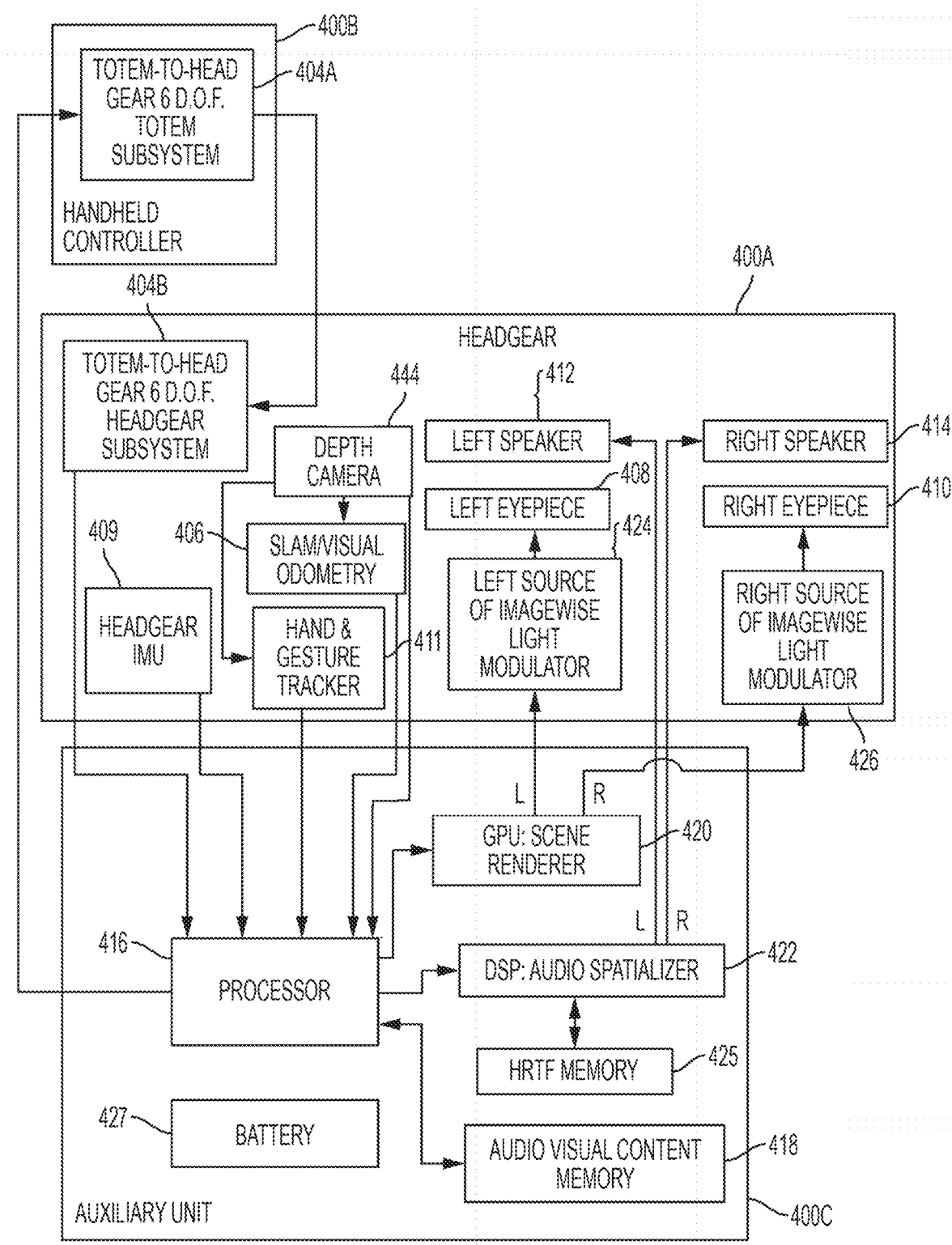
FIG. 4 illustrates an example functional block diagram for an example mixed reality system.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets maybe expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessity for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF wearable head device subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxilary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Virtual Sound Sources

As described above, a MRE (such as experienced via a mixed reality system, e.g., mixed reality system 200 described above) can present, to a user, audio signals that may correspond to a "listener" coordinate, such that the audio signals represent what a user might hear at that listener coordinate. Some audio signals may correspond to a position and/or orientation of a sound source in the MRE; that is, the signals may be presented such that they appear to originate from the position of the sound source in the MRE, and propagate in the direction of the orientation of the sound source in the MRE. In some cases, such audio signals may be considered virtual in that they correspond to virtual content in a virtual environment, and do not necessarily correspond to real sounds in the real environment. The sound associated with virtual content may be synthesized or produced by processing stored sound samples. Virtual audio signals can be presented to a user as real audio signals detectable by the human ear, for example as generated via speakers 2134 and 2136 of wearable head device 2102 in FIGS. 2A-2D.

A sound source may correspond to a real object and/or a virtual object. For example, a virtual object (e.g., virtual monster 132 of FIG. 1C) can emit an audio signal in a MRE, which is represented in the MRE as a virtual audio signal, and presented to the user as a real audio signal. For instance, virtual monster 132 of FIG. 1C can emit a virtual sound corresponding to the monster's speech (e.g., dialogue) or sound effects. Similarly, a real object (e.g., real object 122A of FIG. 1C) can emit a virtual sound in a MRE, which is represented in the MRE as a virtual audio signal, and presented to the user as a real audio signal. For instance, real lamp 122A can emit a virtual sound corresponding to the sound effect of the lamp being switched on or off—even if the lamp is not being switched on or off in the real environment. (The luminance of the lamp can be virtually produced using the eyepieces 2108, 2110 and the sources of imagewise modulated light 2124, 2126.) The virtual sound can correspond to a position and orientation of the sound source (whether real or virtual). For instance, if the virtual sound is presented to the user as a real audio signal (e.g., via speakers 2134 and 2136), the user may perceive the virtual sound as originating from the position of the sound source, and traveling in the direction of an orientation of the sound source. (Sound sources may be referred to herein as "virtual sound sources," even though the sound source may itself correspond to a real object, such as described above.)

In some virtual or mixed reality environments, when users are presented with audio signals, such as described above, they may experience difficulty quickly and accurately identifying the source of the audio signal in the virtual environment—even though identifying audio sources in the real environment is an intuitive natural ability. It is desirable to improve the ability of the user to perceive a position or orientation of the sound source in the MRE, such that the user's experience in a virtual or mixed reality environment more closely resembles the user's experience in the real world.

Similarly, some virtual or mixed reality environments suffer from a perception that the environments do not feel real or authentic. One reason for this perception is that audio and visual cues do not always match each other in virtual environments. For example, if a user is positioned behind a large brick wall in a MRE, the user may expect sounds coming from behind the brick wall to be quieter and more muffled than sounds originating right next to the user. This expectation is based on our own auditory experiences in the real world, where sounds become quiet and muffled when they are obstructed by large, dense objects. When the user is presented with an audio signal that purportedly originates from behind the brick wall, but that is presented unmuffled and at full volume, the illusion that the user is behind a brick wall—or that the sound originates from behind it—is compromised. The entire virtual experience may feel fake and inauthentic, in part because it does not comport with our own expectations based on real world interactions. Further, in some cases, the "uncanny valley" problem arises, in which even subtle differences between virtual experiences and real experiences can cause feelings of discomfort. It is desirable to improve the user's experience by presenting, in a MRE, audio signals that appear to realistically interact—even in subtle ways—with objects in the user's environment. The more consistent that such audio signals are with our own expectations, based on real world experience, the more immersive and engaging the user's MRE experience will be.

One way the human brain detects the position and orientation of sound sources is by interpreting differences between sounds received by the left and right ears. For example, if an audio signal in a real environment reaches the user's left ear before it reaches the right ear—which the human auditory system may determine by, for example, identifying a time delay or phase shift between the left ear signal and the right ear signal—the brain may recognize that the source of the audio signal is to the left of the user. Similarly, because the effective power of audio signals generally decreases with distance, and can be obstructed by the user's own head, if an audio signal appears louder to the left ear than to the right ear, the brain may recognize that the source is to the left of the user. Similarly, our brains recognize that differences in frequency characteristics between a left ear signal and a right ear signal can indicate a position of the source, or a direction in which an audio signal travels.

The above techniques, which the human brain performs subconsciously, operate by processing stereo audio signals—specifically, by analyzing differences (e.g., in amplitude, phase, frequency characteristics), if any, between the respective audio signals generated by a single sound source, and received at the left ear and the right ear. As humans, we naturally rely on these stereo auditory techniques to quickly and accurately identify where the sounds in our real environment come from, and in what direction they are traveling. We also rely on such stereo techniques to better understand the world around us—for example, whether the sound source is on the other side of a nearby wall, and if so, how thick that wall is, and what material it is made of.

It may be desirable for MREs to exploit the same natural stereo techniques that our brains use in the real world, to convincingly place virtual sound sources in a MRE in such a way that a user can quickly locate them. Likewise, it may be desirable to use these same techniques to enhance the feeling that such virtual sound sources coexist with real and virtual content in the MRE—for example, by presenting stereo audio signals, corresponding to those sound sources, that behave as stereo audio signals do in the real world. By presenting a user of a MRE with an audio experience that evokes the audio experiences of our everyday lives, a MRE can enhance the user's feeling of immersion and connectedness when engaging with the MRE.

Figure 5A:
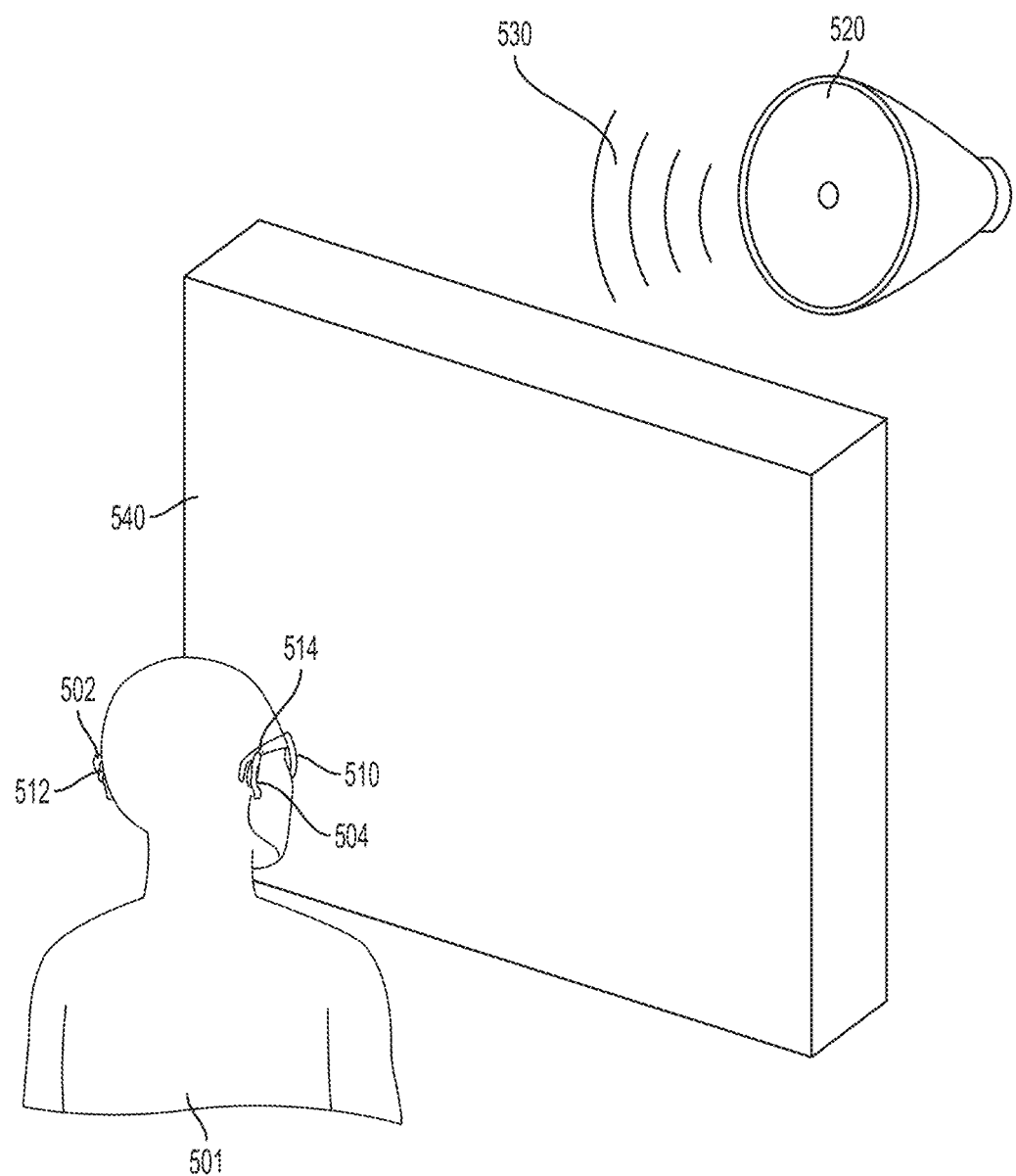
FIGS. 5A-5B illustrate an example mixed reality environment that includes a user, a virtual sound source, and an audio signal originating from the virtual sound source.
Figure 5B:
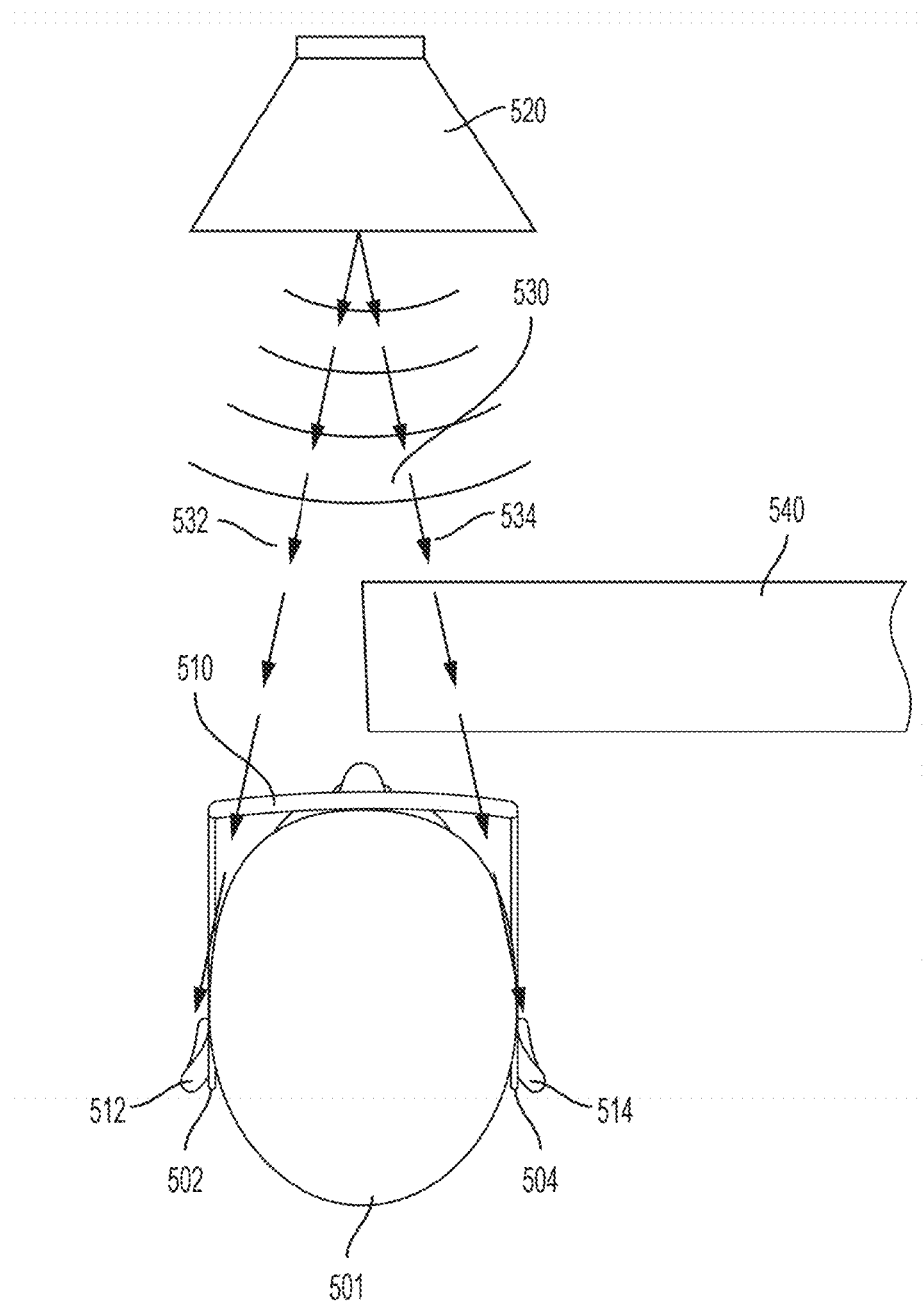

FIGS. 5A and 5B depict a perspective view and a top view, respectively, of an example mixed reality environment 500 (which may correspond to mixed reality environment 150 of FIG. 1C). In MRE 500, user 501 has a left ear 502 and a right ear 504. In the example shown, user 501 is wearing a wearable head device 510 (which may correspond to wearable head device 2102), including a left speaker 512 and a right speaker 514 (which may correspond to speakers 2134 and 2136, respectively). Left speaker 512 is configured to present audio signals to left ear 502, and right speaker 514 is configured to present audio signals to right ear 504.

Example MRE 500 includes a virtual sound source 520, which may have a position and orientation in a coordinate system of MRE 500. In some examples, virtual sound source 520 may be a virtual object (e.g., virtual object 122A in FIG. 1C) and may be associated with a real object (e.g., real object 122B in FIG. 1C). Accordingly, virtual sound source 520 may have any or all of the characteristics described above with respect to virtual objects.

In some examples, virtual sound source 520 may be associated with one or more physical parameters, such as a size, a shape, a mass, or a material. In some examples, the orientation of virtual sound source 520 may correspond to one or more such physical parameters; for instance, in examples where virtual sound source 520 corresponds to a speaker with a speaker cone, the orientation of the virtual sound source 520 may correspond to the axis of the speaker cone. In examples in which virtual sound source 520 is associated with a real object, the physical parameters associated with virtual sound source 520 may be derived from one or more physical parameters of the real object. For instance, if the real object is a speaker with a twelve-inch speaker cone, the virtual sound source 520 could have physical parameters corresponding to a twelve-inch speaker cone (e.g., as virtual object 122B may derive physical parameters or dimensions from corresponding real object 122A of MRE 150).

In some examples, virtual sound source 520 may be associated with one or more virtual parameters, which may affect audio signals or other signals or properties associated with the virtual sound source. Virtual parameters can include spatial properties in a coordinate space of a MRE (e.g., position, orientation, shape, dimensions); visual properties (e.g., color, transparency, reflectivity); physical properties (e.g., density; elasticity; tensile strength; temperature; smoothness; wetness; resonance; electrical conductivity); or other suitable properties of an object. A mixed reality system can determine such parameters, and accordingly generate virtual objects having those parameters. These virtual objects can be rendered to the user (e.g., by wearable head device 510) according to these parameters.

In one example of MRE 500, a virtual audio signal 530 is emitted by virtual sound source 520 at the position of the virtual sound source, and propagates outward from the virtual sound source. In certain instances a anisotropic directivity pattern (e.g., exhibiting frequency-dependent anisotropy) can be associated with the virtual sound source, and the virtual audio signal emitted in a certain direction (e.g., a direction toward the user 501) can be determined based on the directivity pattern. Virtual audio signals are not directly perceptible by a user of the MRE, but can be converted to real audio signals by one or more speakers (e.g., speakers 512 or 514), which produce real audio signals that can be heard by the user. For example, a virtual audio signal may be a computational representation, for instance by a processor and/or memory associated with a MRE, of digital audio data that could be converted to an analog signal via a digital-audio converter; and then amplified and used to drive a speaker, producing sound perceptible by a listener. Such computational representation can comprise, for example, a coordinate in the MRE at which the virtual audio signal originates; a vector in the MRE along which the virtual audio signal propagates; a directivity, a time at which the virtual audio signal originates; a speed at which the virtual audio signal propagates; or other suitable characteristics.

A MRE may also include a representation of one or more listener coordinates, each of which corresponds to a location in a coordinate system (a "listener") at which a virtual audio signal can be perceived. In some examples, a MRE may also include a representation of one or more listener vectors, representing an orientation of a listener (e.g., for use in determining audio signals that may be affected by the direction in which the listener faces). In a MRE, a listener coordinate can correspond to the actual location of a user's ear, which can be determined using SLAM, visual odometry, and/or with the aid of an IMU (e.g., IMU 409 described above with respect to FIG. 4). In some examples, a MRE can include left and right listener coordinates, corresponding to the locations of the user's left and right ears, respectively, in a coordinate system of the MRE. By determining a vector of a virtual audio signal from the virtual sound source to the listener coordinate, a real audio signal can be determined that corresponds to how a human listener with an ear at that coordinate would perceive the virtual audio signal.

In some examples, a virtual audio signal comprises base sound data (e.g., a computer file representing an audio waveform) and one or more parameters that can be applied to that base sound data. Such parameters may correspond to attenuation of the base sound (e.g., a volume drop-off); filtering of the base sound (e.g., a low-pass filter); time delay (e.g., phase shift) of the base sound; reverberation parameters for applying artificial reverb and echo effects; voltage-controlled oscillator (VCO) parameters for applying time-based modulation effects; pitch modulation of the base sound (e.g., to simulate Doppler effects); or other suitable parameters. In some examples, these parameters can be functions of the relationship of the listener coordinate to the virtual audio source. For example, a parameter could define the attenuation of the real audio signal to be a decreasing function of distance from a listener coordinate to the position of the virtual audio source—that is, the gain of audio signal decreases as the distance from the listener to the virtual audio source increases. As another example, a parameter could define a low-pass filter applied to a virtual audio signal to be a function of the distance of the listener coordinate (and/or the angle of a listener vector) to the propagation vector of the virtual audio signal; for instance, a listener far away from the virtual audio signal may perceive less high frequency power in the signal than will a listener closer to the signal. As a further example, a parameter could define a time delay (e.g., phase shift) to be applied based on the distance between the listener coordinate and the virtual audio source. In some examples, processing of the virtual audio signal can be computed using DSP audio spatializer 422 of FIG. 4, which can utilize a HRTF to present an audio signal based on the position and orientation of the user's head.

Virtual audio signal parameters can be affected by virtual or real objects—sound occluders—that the virtual audio signal passes through on its way to a listener coordinate. (As used herein, virtual or real objects include any suitable representation of virtual or real objects in a MRE.) For example, if a virtual audio signal intersects (e.g., is obstructed by) a virtual wall in a MRE, the MRE could apply an attenuation to the virtual audio signal (resulting in the signal appearing quieter to the listener). The MRE could also apply a low-pass filter to the virtual audio signal, resulting in the signal appearing more muffled as high-frequency content is rolled off. These effects are consistent with our expectations of hearing a sound from behind a wall: the properties of a wall in a real environment are such that sounds from the other side of the wall are quieter, and have less high-frequency content, as the wall obstructs sound waves originating on the opposite side of the wall from the listener. The application of such parameters to the audio signal can be based on properties of the virtual wall: for example, a virtual wall that is thicker, or corresponds to denser materials, may result in a greater degree of attenuation or low-pass filtering than a virtual wall that is thinner or that corresponds to less dense materials. In some cases, virtual objects may apply a phase shift, or additional effects, to the virtual audio signal. The effect that a virtual object has on a virtual audio signal can be determined by a physical modeling of the virtual object—for example, if the virtual object corresponds to a particular material (e.g., brick, aluminum, water), effects could be applied based on the known transmission characteristics of an audio signal in the presence of that material in the real world.

In some examples, virtual objects with which an virtual audio signal intersects may correspond to real objects (e.g., such as real objects 122A, 124A, and 126A correspond to virtual objects 122B, 124B, and 126B in FIG. 1C). In some examples, such virtual objects may not correspond to real objects (e.g., such as virtual monster 132 in FIG. 1C). In cases where virtual objects correspond to real objects, the virtual objects may adopt parameters (e.g., dimensions, materials) that correspond to the properties of those real objects.

In some examples, a virtual audio signal may intersect with a real object that does not have a corresponding virtual object. For examples, characteristics of a real object (e.g., position, orientation, dimensions, materials) can be determined by sensors (such as attached to wearable head device 510), which characteristics can be used to process the virtual audio signal, such as described above with respect to virtual object occluders.

Stereo Effects

As noted above, by determining a vector of a virtual audio signal from the virtual sound source to the listener coordinate, a real audio signal can be determined that corresponds to how a human listener with an ear at that listener coordinate would perceive the virtual audio signal. In some examples, left and right stereo listener coordinates (corresponding to the left and right ears) can be used instead of just a single listener coordinate, allowing the effects of real objects on audio signals—for example, attenuation or filtering based on the interaction of an audio signal with a real object—to be determined separately for each ear. This can enhance the realism of a virtual environment by mimicking real-world stereo audio experiences, where receiving different audio signals in each ear can help us to understand the sounds in our surroundings. Such effects, where the left and right ears experience differently affected audio signals, can be especially pronounced where real objects are in close proximity to the user. For example, if the user 501 is pecking around a corner of a real object at a meowing virtual cat, the cat's meowing sounds can be determined and presented differently for each ear. That is, the sound for an ear positioned behind the real object can reflect that the real object, which sits between the cat and the ear, may attenuate and filter the cat's sound as heard by that ear; while the sound for another ear positioned beyond the real object can reflect that the real object performs no such attenuation or filtering. Such sounds can be presented via the users 512, 514 of the wearable head device 510.

Desirable stereo auditory effects, such as described above, can be simulated by determining two such vectors—one for each ear—and identifying a unique virtual audio signal for each ear. Each of these two unique virtual audio signals can then be converted into a real audio signal, and presented to the respective ear via a speaker associated with that ear. The user's brain will process those real audio signals the same way it would process ordinary stereo audio signals in the real world, as described above.

This is illustrated by example MRE 500 in FIGS. 5A and 5B. MRE 500 includes a wall 540 which sits between virtual sound source 520 and user 501. In some examples, wall 540 may be a real object, not unlike real object 126A of FIG. 1C. In some examples, wall 540 may be a virtual object, such as virtual object 122B of FIG. 1C; further, in some such examples, that virtual object may correspond to a real object, such as real object 122A of FIG. 1C.

In examples in which wall 540 is a real object, wall 540 may be detected, for example, using depth cameras, or other sensors of wearable head device 510. This can identify one or more characteristics of the real object, such as its position, orientation, visual properties, or material properties. These characteristics can be associated with wall 540 and included in maintaining an updating MRE 500, such as described above. These characteristics can then be used to process virtual audio signals according to how those virtual audio signals would be affected by wall 540, as described below. In some examples, virtual content such as helper data may be associated with the real object, in order to facilitate processing virtual audio signals affected by the real object. For example, helper data could include geometric primitives that resemble the real object; two-dimensional image data associated with the real object; or custom asset types that identify one or more properties associated with the real object.

In some examples in which wall 540 is a virtual object, the virtual object may be computed to correspond with a real object, which may be detected as described above. For example, with respect to FIG. 1C, real object 122A may be detected by wearable head device 510, and virtual object 122B may be generated to correspond with one or more characteristics of real object 122A, as described above. Additionally, one or more characteristics may be associated with the virtual object that are not derived from its corresponding real object. An advantage of identifying a virtual object associated with a corresponding real object is that the virtual object can be used to simplify calculations associated with wall 540. For example, the virtual object could be geometrically simpler than the corresponding real object. However, in some examples in which wall 540 is a virtual object, there may be no corresponding real object, and wall 540 may be determined by software (e.g., a software script that specifies the existence of wall 540 at a particular position and orientation). Characteristics associated with the wall 540 can be included in maintaining and updating MRE 500, such as described above. These characteristics can then be used to process virtual audio signals according to how those virtual audio signals would be affected by wall 540, as described below.

Wall 540, whether real or virtual, may be considered a sound occluder, as described above. As seen in the top view shown in FIG. 5B, two vectors, 532 and 534, can represent the respective paths of virtual audio signal 530 from virtual sound source 520 to the user's left ear 502 and right ear 504 in MRE 500. Vectors 532 and 534 can correspond to unique left and right audio signals to be presented to the left and right ears, respectively. As shown in the example, vector 534 (corresponding to right ear 504) intersects wall 540, while vector 532 (corresponding to left ear 502) may not. Accordingly, wall 540 may impart different characteristics to the right audio signal than to the left audio signal. For instance, the right audio signal may have attenuation and low-pass filtering applied, corresponding to wall 540, while the left audio signal does not. In some examples, the left audio signal may be phase-shifted or time-shifted relative to the right audio signal, corresponding to a greater distance from left ear 502 to virtual sound source 520 than from right ear 504 to virtual sound source 520 (which would result in an audio signal from that sound source arriving slightly later at left ear 502 than at right ear 504). The user's auditory system can interpret this phase shift or time shift, as it does in the real world, to help identify that virtual sound source 520 is to one side (e.g., the right side) of the user in MRE 500.

The relative importance of these stereo differences may depend on the differences in the frequency spectrum of the signal in question. For example, phase shift may be more useful to locate high-frequency signals than to locate low-frequency audio signals (i.e., signals with a wavelength on the order of the width of a listener's head). With such low-frequency signals, time of arrival differences between the left ear and the right ear may be more useful to locate the source of these signals.

In some examples, not shown in FIGS. 5A-5B, an object (whether real or virtual) such as wall 540 need not sit between user 501 and virtual sound source 520. In such examples, such as where wall 540 sits behind the user, the wall may impart different characteristics to left and right audio signals via reflections of virtual audio signal 530 against wall 540 and toward left and right ears 502 and 504.

An advantage of MRE 500 over some environments, such as a video game presented by a conventional display monitor and room speakers, is that the actual locations of the user's ears in MRE 500 can be determined. As described above with respect to FIG. 4, wearable head device 510 can be configured to identify a location of user 501, e.g., through SLAM, visual odometry techniques, and/or the use of sensors and measurement hardware such as an IMU. In some examples, wearable head device 510 may be configured to directly detect the respective locations of the user's ears (e.g., via sensors associated with ears 502 and 504, speakers 512 and 514, or temple arms (such as temple arms 2130 and 2132 shown in FIGS. 2A-2D)). In some examples, wearable head device 510 may be configured to detect a position of the user's head, and to approximate the respective locations of the user's ears based on that position (e.g., by estimating or detecting the width of the user's head, and identifying the locations of the ears as being located along the circumference of the head and separated by the width of the head). By identifying the locations of the user's ears, audio signals can be presented to the ears that correspond to those particular locations. Compared to technologies that determine audio signals based on an audio receiver coordinate that may or may not correspond to the user's actual ear (e.g., the origin coordinate of a virtual camera in a virtual 3D environment), determining a location of an ear, and presenting an audio signal based on that location, can enhance a user's feelings of immersion in, and connectedness to, the MRE.

By being presented with unique and separately determined left and right audio signals via speakers 512 and 514, respectively, which correspond to left and right listener positions (e.g., the locations of the user's ears 502 and 504 in MRE 500), user 501 is able to identify a position and/or orientation of virtual sound source 520. This is because the user's auditory system naturally attributes the differences (e.g., in gain, frequency, and phase) between the left and right audio signals to the position and orientation of virtual sound source 520, along with the presence of sound occluders, such as wall 540. Accordingly, these stereo audio cues improve user 501's awareness of virtual sound source 520 and wall 540 in MRE 500. This in turn can enhance user 501's feeling of engagement with MRE 500. For instance, if virtual sound source 520 corresponds to an object of importance in MRE 500—for example, a virtual character speaking to user 501—user 501 can use the stereo audio signals to quickly identify the location of that object. This in turn can reduce the cognitive burden on user 501 to identify the object's location, and can also reduce the computational burden on MRE 501—for example, a processor and/or memory (e.g., processor 416 and/or memory 418 of FIG. 4) may no longer need to present user 501 with high fidelity visual cues (e.g., via high-resolution assets such as 3D models and textures, and lighting effects) to identify the object's location, because the audio cues are shouldering more of the work.

Asymmetric occlusion effects such as described above may be especially pronounced in situations where real or virtual objects, such as wall 540, are physically close to the user's face; or where real or virtual objects occlude one ear, but not the other (such as when the center of a user's face is aligned with the edge of wall 540, as seen in FIG. 5B). These situations can be exploited for effect. For example, in MRE 500, user 501 can hide behind an edge of wall 540, peeking around the corner to locate a virtual object (e.g., corresponding to virtual sound source 520) based on the stereo audio effects imparted on that object's sound emissions (e.g., virtual audio signal 530) by the wall. This can allow, for example, for tactical gameplay in gaming environments based on MRE 500; for architectural design applications in which user 501 checks for proper acoustics in different regions of a virtual room; or for educational or creative benefit as user 501 explores the interaction of various audio sources (e.g., virtual birds singing) with his or her environment.

In some examples, each of the left and right audio signals may not be determined independently, but may be based on the other, or on a common audio source. For example, where a single audio source generates both a left audio signal and a right audio signal, the left and right audio signals may be viewed as not entirely independent, but related to each other sonically via the single audio source.

Figure 6:
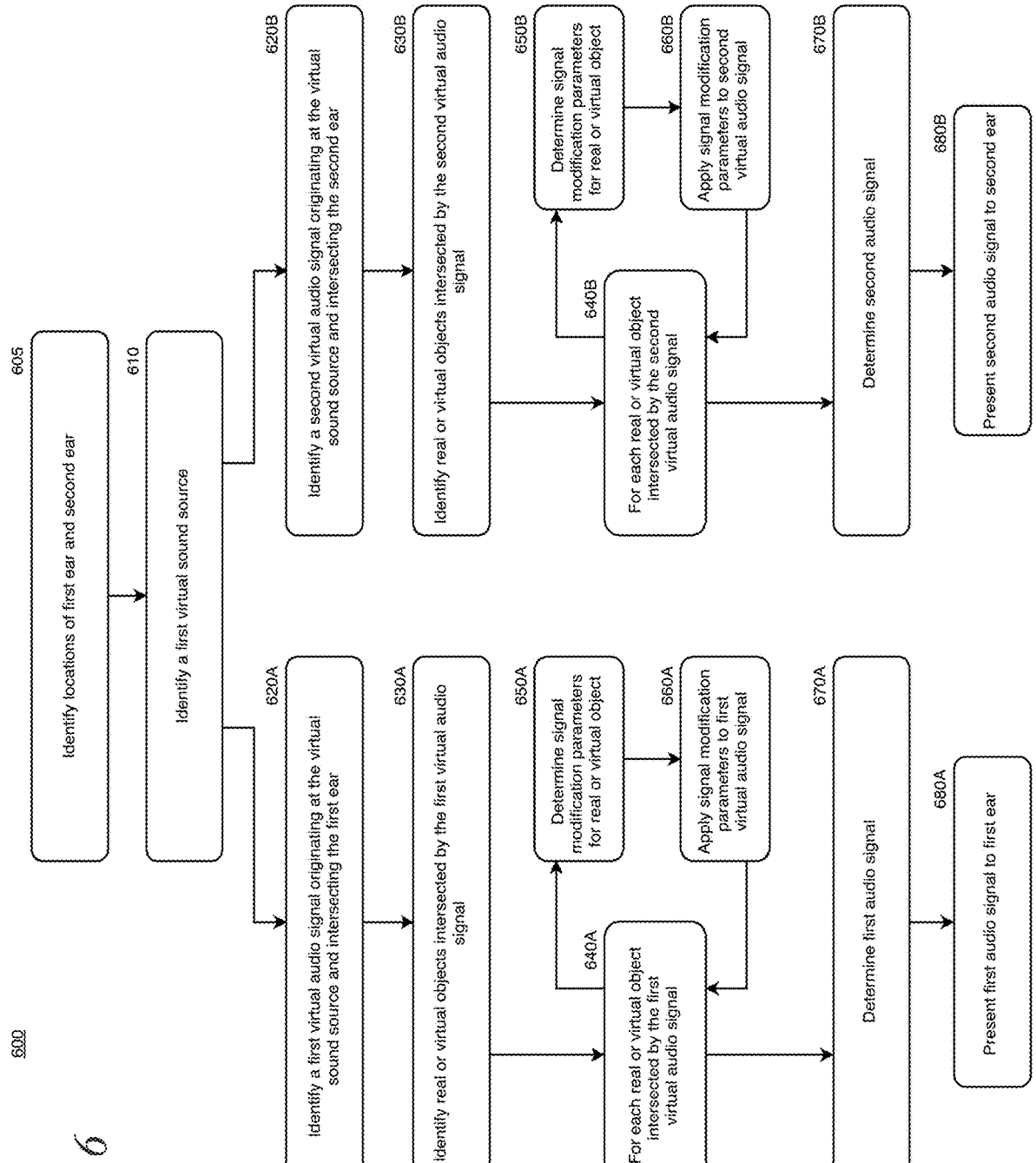
FIG. 6 illustrates an example flow chart of a process for presenting stereo audio signals to a user of a mixed reality environment.

FIG. 6 shows an example process 600 for presenting left and right audio signals to a user of a MRE, such as user 501 of MRE 500. Example process 600 may be implemented by a processor (e.g., corresponding to processor 416 of FIG. 4) and/or a DSP module (e.g., corresponding to DSP audio spatializer 422 of FIG. 4) of wearable head device 510.

At stage 605 of process 600, respective locations (e.g., listener coordinates and/or vectors) of a first ear (e.g., the user's left ear 502) and a second ear (e.g., the user's right ear 504) are determined. These locations can be determined using sensors of wearable head device 510, as described above. Such coordinates can be with respect to a user coordinate system local to the wearable head device (e.g., user coordinate system 114 described above with respect to FIG. 1A). In such a user coordinate system, the origin of such coordinate system may approximately correspond to a center of the user's head—simplifying the representation of the location of a left virtual listener and a right virtual listener. Using SLAM, visual odometry, and/or the IMU the displacement and rotation (e.g., in six degrees of freedom) of the user coordinate system 114 relative to the environment coordinate system 108 can be updated in real time.

At stage 610, a first virtual sound source, which may correspond to virtual sound source 520, can be defined. In some examples, the virtual sound source may correspond to a virtual or real object, which may be identified and located via depth cameras or sensors of wearable head device 510. In some examples, a virtual object may correspond to a real object, such as described above. For example, a virtual object may have one or more characteristics (e.g., position, orientation, materials, visual properties, acoustic properties) of a corresponding real object. A location of the virtual sound source can be established in the coordinate system 108 (FIGS. 1A-1C)

At stage 620A, a first virtual audio signal, which may correspond to virtual audio signal 530 propagating along vector 532, and intersecting the first virtual listener (e.g., a first approximate ear position), can be identified. For example, upon a determination that a sound signal is generated at a first time t by the first virtual sound source, a vector from the first sound source to the first virtual listener can be computed. The first virtual audio signal can be associated with base audio data (e.g., a waveform file), and optionally one or more parameters to modify the base audio data, as described above. Similarly, at stage 620B, a second virtual audio signal, which may correspond to virtual audio signal 530 propagating along vector 534, and intersecting the second virtual listener (e.g., a second approximate ear position), can be identified.

At stage 630A, real or virtual objects intersected by the first virtual audio signal (one of which may, for example, correspond to wall 540) are identified. For example, a trace can be calculated along the vector from the first sound source to the first virtual listener in MRE 500, and real or virtual objects intersecting the trace can be identified (along with, in some examples, parameters of the intersection, such as a position and vector at which a real or virtual object is intersected). In some cases, there may be no such real or virtual objects. Similarly, at stage 630B, real or virtual objects intersected by the second virtual audio signal are identified. Again, in some cases, there may be no such real or virtual objects.

In some examples, real objects identified at stage 630A or stage 630B can be identified using depth cameras or other sensors associated with wearable head device 510. In some examples, virtual objects identified at stage 630A or stage 630B may correspond to real objects, such as described with respect to FIG. 1C and real objects 122A, 124A, and 126A, and corresponding virtual objects 122B, 124B, and 126B. In such examples, such real objects can be identified using depth cameras or other sensors associated with wearable head device 510, and virtual objects can be generated to correspond with those real objects, such as described above.

At stage 640A, each real or virtual object identified at stage 630A is processed to identify, at stage 650A, any signal modification parameters associated with that real or virtual object. For instance, as described above, such signal modification parameters could include functions for determining attenuation, filtering, phase shift, time-based effects (e.g., delay, reverb, modulation), and/or other effects to be applied to the first virtual audio signal. As described above, these parameters can be dependent on other parameters associated with the real or virtual object, such as a size, shape, or material of that real or virtual object. At stage 660A, those signal modification parameters are applied to the first virtual audio signal. For instance, if a signal modification parameter specifies that the first virtual audio signal should be attenuated by a factor that increases linearly with the distance between a listener coordinate and an audio source, that factor can be computed at stage 660A (i.e., by calculating the distance, in MRE 500, between the first ear and the first virtual sound source); and applied to the first virtual audio signal (i.e., by multiplying the amplitude of the signal by the resultant gain factor). In some examples, signal modification parameters can be determined or applied using DSP audio spatializer 422 of FIG. 4, which can utilize a HRTF to modify an audio signal based on the position and orientation of the user's head, such as described above. Once all real or virtual objects identified at stage 630A have been applied at stage 660A, the processed first virtual audio signal (e.g., representing the signal modification parameters of all of the identified real or virtual objects) is output by stage 640A. Similarly, at stage 640B, each real or virtual object identified at stage 630B is processed to identify signal modification parameters (stage 650B), and to apply those signal modification parameters to the second virtual audio signal (stage 660B). Once all real or virtual objects identified at stage 630B have been applied at stage 660B, the processed first virtual audio signal (e.g., representing the signal modification parameters of all of the identified real or virtual objects) is output by stage 640B.

At stage 670A, the processed first virtual audio signal output from stage 640A can be used to determine a first audio signal (e.g., a left channel audio signal) that can be presented to the first ear. For example, at stage 670A, the first virtual audio signal can be mixed with other left-channel audio signals (e.g., other virtual audio signals, music, or dialogue). In some examples, such as in simple mixed reality environments with no other sounds, stage 670A may perform little or no processing to determine the first audio signal from the processed first virtual audio signal. Stage 670A can incorporate any suitable stereo mixing technique. Similarly, at stage 680A, the processed second virtual audio signal output from stage 640B can be used to determine a second audio signal (e.g., a right channel audio signal) that can be presented to the second ear.

At stage 680A and stage 680B, the audio signals output by stage 670A and 670B, respectively, are presented to the first ear and the second ear, respectively. For example, left and right stereo signals can be converted to left and right analog signals (e.g., by DSP audio spatializer 422 of FIG. 4) that are amplified and presented to left and right speakers 512 and 514, respectively. Where left and right speakers 512 and 514 are configured to acoustically couple to left and right ears 502 and 504, respectively, left and right ears 502 and 504 may be presented with their respective left and right stereo signals in sufficient isolation from the other stereo signal, pronouncing the stereo effect.

Figure 7:
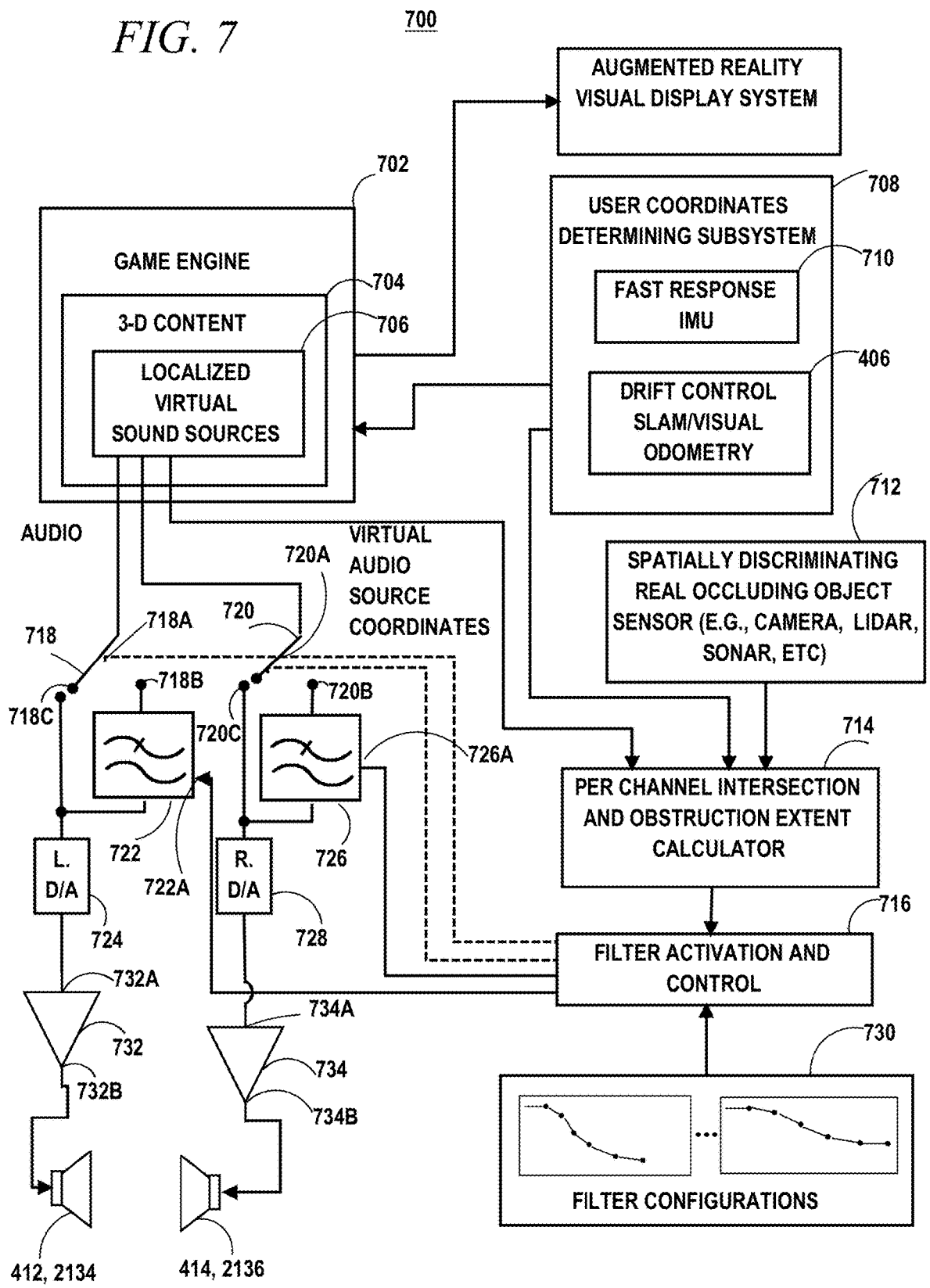
FIG. 7 illustrates an example functional block diagram of an example augmented reality processing system.

FIG. 7 shows a functional block diagram of an example augmented reality processing system 700 that could be used to implement one or more examples described above. The example system 700 can be implemented in a mixed reality system such as mixed reality system 112 described above. FIG. 7 shows aspects of an audio architecture of the system 700. In the example shown, a game engine 702 generates virtual 3D content 704 and simulates events involving the virtual 3D content 704 (which events can include interactions of the virtual 3D content 704 with real objects). The virtual 3D content 704 can include, for example, static virtual objects; virtual objects with functionality, e.g., virtual musical instruments; virtual animals; and virtual people. In the example shown, the virtual 3D content 704 includes localized virtual sound sources 706. The localized virtual sound sources 706 can include sound sources corresponding to, for example, the song of a virtual bird; sounds emitted by a virtual instrument that is played by a user, or by a virtual person; or a voice of a virtual person.

The example augmented reality processing system 700 can integrate virtual 3D content 704 into the real world with a high degree of realism. For example, audio associated with a localized virtual sound source may be located at a distance from a user, and at a location where, if the audio were a real audio signal, it would be partially obstructed by a real object. However, in example system 700, the audio can be output by left and right speakers 412, 414, 2134, 2136 (which may belong, for example, to wearable head device 400A of the mixed reality system 112). That audio, which travels only a short distance from the speakers 2134, 2136 into the user's ears, is not physically affected by the obstruction. However, the system 700, as described below, can alter the audio to take into account the effect of the obstruction.

In example system 700, a user coordinate determining subsystem 708 can be suitably physically housed in the wearable head device 200, 400A. The user coordinate determining subsystem 708 can maintain information about the position (e.g., X, Y, and Z coordinates) and orientation (e.g., roll, pitch, yaw; quaternion) of the wearable head device relative to the real world environment. Virtual content is defined in the environment coordinate system 108 (FIGS. 1A-1C) which is generally fixed relative to the real world. However, in the example, the same virtual content is output via the eyepieces 408, 410 and speakers 412, 414, 2134, 2136, which typically are fixed to the wearable head device 200, 400A and move relative to the real world as the user's head moves. As the wearable head device 200, 400A is displaced or rotated, the spatialization of virtual audio may be adjusted, and the visual display of virtual content should be rerendered, to take into account the displacement and/or rotation. The user coordinate determining subsystem 708 can include an Inertial Measurement Unit (IMU) 710, which can include a set of three orthogonal accelerometers (not shown in FIG. 7) that provide measurements of acceleration (from which displacement can be determined by integration); and three orthogonal gyroscopes (not shown in FIG. 7) that provide measurements of rotation (from which orientation can be determined by integration). To adjust for drift errors in displacements and orientations obtained from the IMU 710, a Simultaneous Localization and Mapping (SLAM) and/or visual odometly block 406 can be included in the user coordinate determining system 708. As shown in FIG. 4, the depth cameras 444 can be coupled to, and provide imagery input for, the SLAM and/or visual odometry block 406.

A spatially discriminating, real occluding object sensor subsystem 712 ("occlusion subsystem") is included in the example augmented reality processing system 700. The occlusion subsystem 712 can include, for example, depth cameras 444; non-depth cameras (not shown in FIG. 7); Sound Navigation and Ranging (SONAR) sensors (not shown in FIG. 7); and/or Light Detection and Ranging (LIDAR) sensors (not shown in FIG. 7). The occlusion subsystem 712 can have spatial resolution sufficient to discriminate between obstructions that affect virtual propagation paths corresponding to the left and right listener positions. For example, if a user of wearable head device 200, 400A is peeking around a real corner at a virtual sound emitting virtual object (e.g., a virtual game opponent where a wall forming the corner is blocking a direct line of sight to the user's left ear, but not the user's right car), the occlusion subsystem 712 can sense the obstruction with sufficient resolution to determine that only the direct path to the left ear would be occluded. In some examples, the occlusion subsystem 712 may have greater spatial resolution and may be able to determine a size (or solid angle subtense) of, and distance to, occluding real objects.

In the example shown in FIG. 7, the occlusion subsystem 712 is coupled to a per-channel (i.e., left and right audio channel) intersection and obstruction extent calculator (herein, "obstruction calculator") 714. In the example, the user coordinate determining system 708 and the game engine 702 are also coupled to the obstruction calculator 714. The obstruction calculator 714 can receive coordinates of virtual audio sources from the game engine 702, user coordinates from the user coordinate determining system 708, and information indicative of the coordinates (e.g., angular coordinates optionally including distance) of obstructions from the occlusion subsystem 712. By applying geometry, the obstruction calculator 714 can determine whether there is an obstructed or unobstructed line of sight from each virtual audio source to each of the left and right listener positions. Although shown in FIG. 7 as a separate block, the obstruction calculator 714 can be integrated with the game engine 702. In some examples, occlusions may be initially sensed by the occlusion subsystem 712 in a user-centric coordinate system, based on information from the user coordinate determining system 708, with the coordinates of the occlusion transformed to the environment coordinate system 108 for the purpose of analyzing the obstruction geometry. In some examples, the coordinates of virtual sound sources may be transformed to a user-centric coordinate system for the purpose of calculating obstruction geometry. In some examples in which the occlusion subsystem 712 provides spatially resolved information about occluding objects, the obstruction calculator 714 can determine a range of solid angles about the line of sight that is occluded by obstructing objects. An obstruction that has a larger solid angle extent can be taken into account by applying a larger attenuation and/or attenuation of a greater range of high frequency components.

In some examples, the localized virtual sound sources 706 can include a mono audio signal or left and right spatialized audio signals. Such left and right spatialized audio signals can be determined by applying left and right Head Related Transfer Functions (HRTFs) that may be selected based on the coordinates of the localized virtual sound sources relative to the user. In example 700, the game engine 702 is coupled to and receives coordinates (e.g., position and orientation) of the user from the user coordinate determining system 708. The game engine 702 itself can determine the coordinates of the virtual sound sources (for example, in response to user input) and, upon receiving the user coordinates, can determine the coordinates of the sound sources relative to the user by geometry.

In the example shown in FIG. 7, the obstruction calculator 714 is coupled to a filter activation and control 716. In some examples, the filter activation and control 716 is coupled to a left control input 718A of a left filter bypass switch 718 and is coupled to a right control input 720A of a right filter bypass switch 720. In some examples, as in the case of other components of the example system 700, the bypass switches 718, 720 can be implemented in software. In the example shown, the left filter bypass switch 718 receives a left channel of spatialized audio from the game engine 702, and the right filter bypass switch 720 receives right spatialized audio from the game engine 704. In some examples in which the game engine 702 outputs a mono audio signal, both bypass switches 718, 720 can receive the same mono audio signal.

In the example shown in FIG. 7, a first output 718B of the left bypass switch 718 is coupled through a left obstruction filter 722 to a left digital-to-analog converter ("left D/A") 724, and second output 718C of the left bypass switch 718 is coupled to the left D/A 724 (bypassing the left obstruction filter 722). Similarly, in the example, a first output 720B of the right bypass switch 720 is coupled through a right obstruction filter 726 to the right digital-to-analog converter ("right D/A") 728, and a second output 720C is coupled to the right D/A 728 (bypassing the right obstruction filter 726).

In the example shown in FIG. 7, a set of filter configurations 730 can be used (e.g., by filter activation and control 716) to configure the left obstruction filter 722 and/or the right obstruction filter based on the output of the per channel intersection and obstruction extent calculator 722. In some examples, instead of providing bypass switches 718, 720, a non-filtering pass-through configuration of the obstruction filters 722, 726 can be used. The obstruction filters 722, 726 can be time domain or frequency domain filters. In examples in which the filters are time domain filters, each filter configuration can include a set of tap coefficients; in examples in which the filters are frequency domain filters, each filter configuration can include a set of frequency band weights. In some examples, instead of a set number of predetermined filter configurations, the filter activation and control 716 can be configured (e.g., programmatically) to define a filter that has a certain level of attenuation depending on a size of an obstruction. The filter activation and control 716 can select or define filter configurations (e.g., configurations that are more attenuating for larger obstructions), and/or can select or define filters that attenuate higher frequency bands (e.g., to a greater degree for larger obstructions in order to simulate the effect of real obstructions).

In the example shown in FIG. 7, the filter activation and control 716 is coupled to a control input 722A of the left obstruction filter 722 and to a control input 726A of the right obstruction filter 726. The filter activation and control 716 can separately configure the left obstruction filter 722 and the right obstruction filter 726 using selected configurations from the filter configurations 730, based on output from the per channel intersection and obstruction extent calculator 714.

In the example shown in FIG. 7, the left D/A 724 is coupled to an input 732A of a left audio amplifier 732, and the right D/A 728 is coupled to an input 734A of a right audio amplifier 734. In the example, an output 732B of the left audio amplifier 732 is coupled to a left speaker 2134, 412 and an output 734B of the right audio amplifier 734 is coupled to a right speaker 2136, 414.

It should be noted that the elements of the example functional block diagram shown in FIG. 7 can be arranged in any suitable order—not necessarily the order shown. Further, some elements shown in the example in FIG. 7 (e.g., bypass switches 718, 720) can be omitted as appropriate. The disclosure is not limited to any particular order or arrangement of the functional components shown in the example.

Some examples of the disclosure are directed to a method of presenting audio signals in a mixed reality environment, the method comprising: identifying a first ear listener position in the mixed reality environment; identifying a second ear listener position in the mixed reality environment; identifying a first virtual sound source in the mixed reality environment; identifying a first object in the mixed reality environment; determining a first audio signal in the mixed reality environment, wherein the first audio signal originates at the first virtual sound source and intersects the first ear listener position; determining a second audio signal in the mixed reality environment, wherein the second audio signal originates at the first virtual sound source, intersects the first object, and intersects the second ear listener position; determining a third audio signal based on the second audio signal and the first object; presenting, via a first speaker to a first ear of a user, the first audio signal; and presenting, via a second speaker to a second ear of the user, the third audio signal. Additionally or alternatively to one or more of the examples disclosed above, in some examples, determining the third audio signal from the second audio signal comprises applying a low-pass filter to the second audio signal, the low-pass filter having a parameter based on the first virtual object. Additionally or alternatively to one or more of the examples disclosed above, in some examples, determining the third audio signal from the second audio signal comprises applying an attenuation to the second audio signal, the strength of the attenuation based on the first object. Additionally or alternatively to one or more of the examples disclosed above, in some examples, identifying the first object comprises identifying a real object. Additionally or alternatively to one or more of the examples disclosed above, in some examples, identifying the real object comprises using a sensor to determine a position of the real object relative to the user in the mixed reality environment. Additionally or alternatively to one or more of the examples disclosed above, in some examples, the sensor comprises a depth camera. Additionally or alternatively to one or more of the examples disclosed above, in some examples, the method further comprises generating helper data corresponding to the real object. Additionally or alternatively to one or more of the examples disclosed above, in some examples, the method further comprises generating a virtual object corresponding to the real object. Additionally or alternatively to one or more of the examples disclosed above, in some examples, the method further comprises identifying a second virtual object, wherein the first audio signal intersects the second virtual object and a fourth audio signal is determined based on the second virtual object.

Some examples of the disclosure are directed to a system comprising: a wearable head device comprising: a display for displaying a mixed reality environment to a user, the display comprising a transmissive eyepiece through which a real environment is visible; a first speaker configured to present audio signals to a first ear of the user; and a second speaker configured to present audio signals to a second ear of the user; and one or more processors confirmed to perform: identifying a first ear listener position in the mixed reality environment; identifying a second ear listener position in the mixed reality environment; identifying a first virtual sound source in the mixed reality environment; identifying a first object in the mixed reality environment; determining a first audio signal in the mixed reality environment, wherein the first audio signal originates at the first virtual sound source and intersects the first ear listener position; determining a second audio signal in the mixed reality environment, wherein the second audio signal originates at the first virtual sound source, intersects the first object, and intersects the second ear listener position; determining a third audio signal based on the second audio signal and the first object; presenting, via a first speaker to the first ear, the first audio signal; and presenting, via a second speaker to the second car, the third audio signal. Additionally or alternatively to one or more of the examples disclosed above, in some examples, determining the third audio signal from the second audio signal comprises applying a low-pass filter to the second audio signal, the low-pass filter having a parameter based on the first object. Additionally or alternatively to one or more of the examples disclosed above, in some examples, determining the third audio signal from the second audio signal comprises applying an attenuation to the second audio signal, the strength of the attenuation based on the first object. Additionally or alternatively to one or more of the examples disclosed above, in some examples, identifying the first object comprises identifying a real object. Additionally or alternatively to one or more of the examples disclosed above, in some examples, the wearable head device further comprises a sensor, and identifying the real object comprises using the sensor to determine a position of the real object relative to the user in the mixed reality environment. Additionally or alternatively to one or more of the examples disclosed above, in some examples, the sensor comprises a depth camera. Additionally or alternatively to one or more of the examples disclosed above, in some examples, the one or more processors are configured to perform generating helper data corresponding to the real object. Additionally or alternatively to one or more of the examples disclosed above, in some examples, the one or more processors are further configured to perform generating a virtual object corresponding to the real object. Additionally or alternatively to one or more of the examples disclosed above, in some examples, the one or more processors are further configured to perform identifying a second virtual object, wherein the first audio signal intersects the second virtual object and a forth audio signal is determined based on the second virtual object.

Although the disclosed examples have been fully described with reference to the accompanying drawings, it is to be noted that various changes and modifications will become apparent to those skilled in the art. For example, elements of one or more implementations may be combined, deleted, modified, or supplemented to folm further implementations. Such changes and modifications are to be understood as being included within the scope of the disclosed examples as defined by the appended claims.

The invention claimed is:

1. A method of presenting audio signals in a mixed reality environment, the method comprising:
   identifying a virtual sound source in the mixed reality environment;
   identifying an object in the mixed reality environment;
   determining, via one or more sensors of a wearable head device, a parameter of the object, wherein the parameter of the object is associated with at least one of a filtering, a phase shift, a delay, and a modulation;
   determining a first audio signal in the mixed reality environment, wherein the first audio signal is associated with the virtual sound source;
   determining a second audio signal based on the first audio signal and based further on the parameter, wherein:
      the second audio signal is associated with an interaction of the first audio signal with the object having the parameter in the mixed reality environment, and
      the second audio signal is determined further based on the interaction; and
   presenting, via a speaker of the wearable head device, the second audio signal.

2. The method of claim 1, wherein the first audio signal corresponds to a signal path that intersects the object in the mixed reality environment.

3. The method of claim 1, further comprising identifying, via the one or more sensors, a listener position in the mixed reality environment, wherein the second audio signal is presented to the listener.

4. The method of claim 1, wherein said identifying the object comprises identifying a real object.

5. The method of claim 1, wherein said identifying the object comprises using the one or sensors to determine a position of the object in the mixed reality environment.

6. The method of claim 1, wherein said identifying the object comprises identifying a virtual object.

7. The method of claim 1, wherein the second audio signal is determined further in accordance with a determination that the first audio signal corresponds to a signal path that intersects the object in the mixed reality environment.

8. The method of claim 1, wherein the parameter is further associated with an attenuation.

9. The method of claim 1, wherein the parameter is associated with a reverb.

10. The method of claim 1, wherein the one or more sensors comprises a camera.

11. The method of claim 1, wherein said determining the second audio signal comprises applying at least one of a filter and an attenuation to the first audio signal.

12. The method of claim 1, wherein the interaction comprises a physical interaction between the first audio signal and the object.

13. A wearable head device comprising:
   a speaker;
   one or more sensors; and
   one or more processors configured to perform a method comprising:
      identifying a virtual sound source in the mixed reality environment;
      identifying an object in the mixed reality environment;
      determining, via the one or more sensors, a parameter of the object, wherein the parameter of the object is associated with at least one of a filtering, a phase shift, a delay, and a modulation;
      determining a first audio signal in the mixed reality environment, wherein the first audio signal is associated with the virtual sound source;
      determining a second audio signal based on the first audio signal and based further on the parameter, wherein:
         the second audio signal is associated with an interaction of the first audio signal with the object having the parameter in the mixed reality environment, and
         the second audio signal is determined further based on the interaction; and
      presenting, via the speaker, the second audio signal.

14. The wearable head device of claim 13, wherein the first audio signal corresponds to a signal path that intersects the object in the mixed reality environment.

15. The wearable head device of claim 13, wherein said identifying the object comprises identifying a real object.

16. The wearable head device of claim 13, wherein said identifying the object comprises identifying a virtual object.

17. The wearable head device of claim 13, wherein the parameter is further associated an attenuation.

18. The wearable head device of claim 13, wherein the one or more sensors comprises a camera.

19. The wearable head device of claim 13, wherein the interaction comprises a physical interaction between the first audio signal and the object.

20. A non-transitory computer-readable medium storing instructions that, when executed by one or more processors, cause the one or more processors to perform a method comprising:
   identifying a virtual sound source in the mixed reality environment;
   identifying an object in the mixed reality environment;
   determining, via one or more sensors of a wearable head device, a parameter of the object, wherein the parameter of the object is associated with at least one of a filtering, a phase shift, a delay, and a modulation;
   determining a first audio signal in the mixed reality environment, wherein the first audio signal is associated with the virtual sound source;
   determining a second audio signal based on the first audio signal and based further on the parameter, wherein:
      the second audio signal is associated with an interaction of the first audio signal with the object having the parameter in the mixed reality environment, and
      the second audio signal is determined further based on the interaction; and
   presenting, via a speaker of the wearable head device, the second audio signal.

* * * * *